United States Patent
Teshima

(10) Patent No.: US 8,670,636 B2
(45) Date of Patent: Mar. 11, 2014

(54) IMAGE REGISTRATION SYSTEM

(75) Inventor: Atsushi Teshima, Kawasaki (JP)

(73) Assignee: Fujifilm Corporation, Tokyo (JP)

( * ) Notice: Subject to any disclaimer, the term of this patent is extended or adjusted under 35 U.S.C. 154(b) by 200 days.

(21) Appl. No.: 13/163,560

(22) Filed: Jun. 17, 2011

(65) Prior Publication Data
US 2011/0249913 A1 Oct. 13, 2011

Related U.S. Application Data

(63) Continuation of application No. 09/872,008, filed on Jun. 4, 2001, now Pat. No. 7,965,906.

(30) Foreign Application Priority Data

Jun. 5, 2000 (JP) ................................. 2000-167812

(51) Int. Cl.
*G06K 9/00* (2006.01)

(52) U.S. Cl.
USPC ........... 382/305; 382/306; 382/311; 709/246; 709/219; 709/217

(58) Field of Classification Search
USPC ........... 382/305, 306, 311; 709/246, 219, 217
See application file for complete search history.

(56) References Cited

U.S. PATENT DOCUMENTS

| 6,035,323 | A | 3/2000 | Narayen et al. |
| 6,330,068 | B1 | 12/2001 | Matsuyama |
| 6,658,167 | B1* | 12/2003 | Lee et al. ..................... 382/305 |
| 6,708,309 | B1 | 3/2004 | Blumberg |
| 2002/0023127 | A1* | 2/2002 | Sabeti ........................ 709/203 |

FOREIGN PATENT DOCUMENTS

| JP | 11-65950 | 3/1993 |
| JP | 11-136394 | 5/1999 |
| JP | 11-175425 | 7/1999 |
| JP | 2000-134603 | 5/2000 |

OTHER PUBLICATIONS

Japanese Office Action dated Mar. 25, 2008, with English translation.
Japanese Office Action dated Sep. 21, 2004, with English translation.

* cited by examiner

*Primary Examiner* — Wesley Tucker
(74) *Attorney, Agent, or Firm* — McGinn IP Law Group, PLLC

(57) ABSTRACT

An image registration server which can communicate with a client device, includes an image data receiving device for receiving image data transmitted from the client device, an image data generation device for generating image data representing the same image as an image represented by the image data received by the image data receiving device and having a different form of representation therefrom, and an image data storage device for storing the image data generated by the image data generation device so as to be accessible.

8 Claims, 26 Drawing Sheets

*Fig. 3*

SUPPORT INFORMATION TABLE

| CLIENT CODE | ACCESS DEVICE | SYSTEM | TYPE | HEADER 1 | HEADER 2 | SUPPORT | OUTPUT TYPE | OUTPUT SIZE | TRIMMING | OUTPUT RESOLUTION | COLOR MODE | COLOR DEPTH | GAMMA CORRECTION | DITHER PROCESSING | IMAGE FORMAT |
|---|---|---|---|---|---|---|---|---|---|---|---|---|---|---|---|
| PC11 | PC | OS-1 | Browser-a | Cherry | BA | PRESENCE | DISPLAY | 800×600 | INSCRIPTION | - | RGB | 8:8:8 | NO | - | FORMAT 1 |
| PC12 | | | Browser-b | | BB | PRESENCE | DISPLAY | 780×560 | INSCRIPTION | - | RGB | 8:8:8 | NO | - | FORMAT 1 |
| PC10 | | | STANDARD | | - | PRESENCE | DISPLAY | 640×480 | INSCRIPTION | - | RGB | 8:8:8 | NO | - | FORMAT 1 |
| PC21 | | OS-2 | Browser-a | Bamboo | BA | PRESENCE | DISPLAY | 788×588 | INSCRIPTION | - | RGB | 8:8:8 | GAMMA 1 | - | FORMAT 1 |
| PC22 | | | Browser-b | | BB | PRESENCE | DISPLAY | 768×548 | INSCRIPTION | - | RGB | 8:8:8 | GAMMA 1 | - | FORMAT 1 |
| PC20 | | | STANDARD | | - | PRESENCE | DISPLAY | 500×362 | INSCRIPTION | - | RGB | 8:8:8 | GAMMA 1 | - | FORMAT 1 |
| PC00 | | STANDARD | STANDARD | - | - | PRESENCE | DISPLAY | 400×300 | INSCRIPTION | - | RGB | 8:8:8 | NO | - | FORMAT 1 |
| PT10 | PORTABLE TERMINAL | PDA-1 (PORTABLE INFORMATION TERMINAL) | STANDARD | Plum | - | ABSENCE | DISPLAY | 160×120 | INSCRIPTION | - | B/W | - | NO | YES | FORMAT 1 |
| PT21 | | PDA-2 (PORTABLE INFORMATION TERMINAL) | PDA-2-a | Pine | A100 | ABSENCE | DISPLAY | 640×240 | INSCRIPTION | - | B/W | - | NO | YES | FORMAT 1 |
| PT22 | | | PDA-2-b | | B200 | ABSENCE | DISPLAY | 640×240 | INSCRIPTION | - | RGB | 4:4:2 | NO | YES | FORMAT 1 |
| PT20 | | | STANDARD | | - | ABSENCE | DISPLAY | 640×240 | INSCRIPTION | - | B/W | - | NO | YES | FORMAT 1 |
| PT31 | | SmartPhone-1 (PORTABLE TELEPHONE SET) | SP-1-a | K-Style | A501K | PRESENCE | DISPLAY | 98×64 | INSCRIPTION | - | B/W | - | GAMMA 2 | YES | FORMAT 2 |
| PT32 | | | SP-1-b | | B501K | PRESENCE | DISPLAY | 112×94 | INSCRIPTION | - | GRAY | 2 | GAMMA 2 | YES | FORMAT 2 |
| PT33 | | | SP-1-c | | C501K | PRESENCE | DISPLAY | 78×64 | INSCRIPTION | - | RGB | 4:4:2 | GAMMA 3 | YES | FORMAT 2 |
| PT34 | | | SP-1-d | | D501K | PRESENCE | DISPLAY | 88×62 | INSCRIPTION | - | GRAY | 2 | GAMMA 2 | YES | FORMAT 2 |
| PT30 | | | STANDARD | | - | PRESENCE | DISPLAY | 78×62 | INSCRIPTION | - | B/W | - | NO | YES | FORMAT 2 |
| PT41 | | SmartPhone-2 (PORTABLE TELEPHONE SET) | SP-2-a | MyPhone | A02 | PRESENCE | DISPLAY | 96×84 | INSCRIPTION | - | RGB | 4:4:2 | GAMMA 3 | YES | FORMAT 3 |
| PT42 | | | SP-2-b | | B02 | PRESENCE | DISPLAY | 114×102 | INSCRIPTION | - | GRAY | 2 | GAMMA 2 | YES | FORMAT 3 |
| PT40 | | | STANDARD | | - | PRESENCE | DISPLAY | 96×84 | INSCRIPTION | - | GRAY | 2 | NO | YES | FORMAT 3 |
| PT00 | | STANDARD | STANDARD | - | - | PRESENCE | DISPLAY | 78×62 | INSCRIPTION | - | B/W | - | NO | YES | FORMAT 2 |
| PS11 | PRINT SERVER | THERMAL PRINTER | TA-a | P_Thermo | A7 | ABSENCE | PAPER | A5 | CIRCUMSCRIPTION | 300dpi | CMY | 8:8:8 | GAMMA 4 | - | FORMAT 1 |
| PS12 | | | TA-b | | B700 | ABSENCE | PAPER | A5 | CIRCUMSCRIPTION | 600dpi | CMY | 8:8:8 | GAMMA 4 | - | FORMAT 1 |
| PS10 | | | STANDARD | | - | ABSENCE | PAPER | A5 | CIRCUMSCRIPTION | 150dpi | CMY | 8:8:8 | GAMMA 4 | - | FORMAT 1 |
| PS21 | | THERMAL PRINTER | FLP-a | P_Exposur | FL7000 | PRESENCE | PAPER | A6 | CIRCUMSCRIPTION | 300dpi | CMY | 8:8:8 | GAMMA 5 | - | FORMAT 1 |
| PS22 | | | FLP-b | | FL9000 | PRESENCE | PAPER | A5 | CIRCUMSCRIPTION | 600dpi | CMY | 8:8:8 | GAMMA 5 | - | FORMAT 1 |
| PS20 | | | STANDARD | | - | PRESENCE | PAPER | A5 | CIRCUMSCRIPTION | 150dpi | CMY | 8:8:8 | GAMMA 5 | - | FORMAT 1 |
| PS30 | | LASER PRINTER | STANDARD | P_Laser | - | ABSENCE | PAPER | A4 | INSCRIPTION | 600dpi | B/W | - | NO | NO | FORMAT 4 |
| PS40 | | INKJET PRINTER | STANDARD | P_Inc | - | ABSENCE | PAPER | A3 | INSCRIPTION | 600dpi | CMY | 2:2:2 | GAMMA 6 | YES | FORMAT 5 |
| PS00 | | STANDARD | STANDARD | P | - | PRESENCE | PAPER | A4 | INSCRIPTION | 150dpi | B/W | - | NO | NO | FORMAT 1 |
| FS00 | FACSIMILE CONVERSION | STANDARD | STANDARD | - | FAX | ABSENCE | PAPER | A4 | INSCRIPTION | 180dpi | B/W | - | NO | NO | FORMAT 6 |
| DF00 | | STANDARD | STANDARD | - | - | PRESENCE | DISPLAY | 78×62 | INSCRIPTION | - | B/W | - | NO | NO | FORMAT 1 |

ORIGINAL IMAGE (1200 PIXELS × 1200 PIXELS
RGB COLOR
JPEG IMAGE FORMAT)

IMAGE FOR PC11 (600 PIXELS × 600 PIXELS
RGB COLOR
JPEG IMAGE FORMAT
INSCRIPTION TRIMMING)

IMAGE FOR PT31 (64 PIXELS × 64 PIXELS
DITHER AND 256 COLORS
PNG IMAGE FORMAT
INSCRIPTION TRIMMING)

SUPPORT INFORMATION TABLE

| CLIENT CODE | ACCESS DEVICE | SYSTEM | TYPE | HEADER 1 | HEADER | SUPPORT | REQUEST | OUTPUT TYPE | OUTPUT SIZE | TRIMMING | OUTPUT RESOLUTION | COLOR MODE | COLOR DEPTH | GAMMA CORRECTION | DITHER PROCESSING | IMAGE FORMAT |
|---|---|---|---|---|---|---|---|---|---|---|---|---|---|---|---|---|
| PC11 | PC | OS-1 | Browser-a | Cherry | BA | PRESENCE | - | DISPLAY | 800×600 | INSCRIPTION | - | RGB | 8:8:8 | NO | - | FORMAT 1 |
| PC12 | | | Browser-b | | BB | PRESENCE | - | DISPLAY | 780×560 | INSCRIPTION | - | RGB | 8:8:8 | NO | - | FORMAT 1 |
| PC10 | | | STANDARD | | - | PRESENCE | - | DISPLAY | 640×480 | INSCRIPTION | - | RGB | 8:8:8 | NO | - | FORMAT 1 |
| PC21 | | OS-2 | Browser-a | Bamboo | BA | PRESENCE | - | DISPLAY | 788×588 | INSCRIPTION | - | RGB | 8:8:8 | GAMMA 1 | - | FORMAT 1 |
| PC22 | | | Browser-b | | BB | PRESENCE | - | DISPLAY | 768×548 | INSCRIPTION | - | RGB | 8:8:8 | GAMMA 1 | - | FORMAT 1 |
| PC20 | | | STANDARD | | - | PRESENCE | - | DISPLAY | 500×362 | INSCRIPTION | - | RGB | 8:8:8 | GAMMA 1 | - | FORMAT 1 |
| PC00 | | STANDARD | STANDARD | | - | PRESENCE | - | DISPLAY | 400×300 | INSCRIPTION | - | RGB | 8:8:8 | NO | - | FORMAT 1 |
| PT10 | PORTABLE TERMINAL | PDA-1(PORTABLE INFORMATION TERMINAL) | STANDARD | Plum | - | ABSENCE | - | DISPLAY | 160×120 | INSCRIPTION | - | B/W | - | NO | YES | FORMAT 1 |
| PT21 | | PDA-2(PORTABLE INFORMATION TERMINAL) | PDA-2-a | Pine | A100 | ABSENCE | - | DISPLAY | 640×240 | INSCRIPTION | - | B/W | - | NO | YES | FORMAT 1 |
| PT22 | | | PDA-2-b | | B200 | ABSENCE | - | DISPLAY | 640×240 | INSCRIPTION | - | RGB | 4:4:2 | NO | YES | FORMAT 1 |
| PT20 | | | STANDARD | | - | ABSENCE | - | DISPLAY | 640×240 | INSCRIPTION | - | B/W | - | NO | YES | FORMAT 1 |
| PT31 | | SmartPhone-1 (PORTABLE TELEPHONE SET) | SP-1-a | K-Style | A501K | PRESENCE | - | DISPLAY | 98×64 | INSCRIPTION | - | B/W | - | GAMMA 2 | YES | FORMAT 2 |
| PT32 | | | SP-1-b | | B501K | R200 | 123 | DISPLAY | 112×94 | INSCRIPTION | - | GRAY | 2 | GAMMA 2 | YES | FORMAT 2 |
| PT33 | | | SP-1-c | | C501K | PRESENCE | - | DISPLAY | 78×64 | INSCRIPTION | - | RGB | 4:4:2 | GAMMA 3 | YES | FORMAT 2 |
| PT34 | | | SP-1-d | | D501K | PRESENCE | - | DISPLAY | 88×62 | INSCRIPTION | - | GRAY | 2 | GAMMA 2 | YES | FORMAT 2 |
| PT30 | | | STANDARD | | - | PRESENCE | - | DISPLAY | 78×62 | INSCRIPTION | - | B/W | - | NO | YES | FORMAT 2 |
| PT41 | | SmartPhone-2 (PORTABLE TELEPHONE SET) | SP-2-a | MyPhone | A02 | PRESENCE | - | DISPLAY | 96×84 | INSCRIPTION | - | RGB | 4:4:2 | GAMMA 3 | YES | FORMAT 3 |
| PT42 | | | SP-2-b | | B02 | PRESENCE | - | DISPLAY | 114×102 | INSCRIPTION | - | GRAY | 2 | GAMMA 2 | YES | FORMAT 3 |
| PT40 | | | STANDARD | | - | PRESENCE | - | DISPLAY | 96×84 | INSCRIPTION | - | GRAY | 2 | NO | YES | FORMAT 3 |
| PT00 | | STANDARD | STANDARD | | - | PRESENCE | - | DISPLAY | 78×62 | INSCRIPTION | - | B/W | - | NO | YES | FORMAT 2 |
| PS11 | PRINT SERVER | THERMAL PRINTER | TA-a | P_Thermo | A7 | R200 | 45 | PAPER | A5 | CIRCUMSCRIPTION | 300dpi | CMY | 8:8:8 | GAMMA 4 | - | FORMAT 2 |
| PS12 | | | TA-b | | B700 | ABSENCE | - | PAPER | A5 | CIRCUMSCRIPTION | 600dpi | CMY | 8:8:8 | GAMMA 4 | - | FORMAT 1 |
| PS10 | | | STANDARD | | - | ABSENCE | - | PAPER | A5 | CIRCUMSCRIPTION | 150dpi | CMY | 8:8:8 | GAMMA 4 | - | FORMAT 1 |
| PS21 | | THERMAL PRINTER | FLP-a | P_Exposure | FL7000 | PRESENCE | - | PAPER | A6 | CIRCUMSCRIPTION | 300dpi | CMY | 8:8:8 | GAMMA 5 | - | FORMAT 1 |
| PS22 | | | FLP-b | | FL9000 | PRESENCE | - | PAPER | A5 | CIRCUMSCRIPTION | 600dpi | CMY | 8:8:8 | GAMMA 5 | - | FORMAT 1 |
| PS20 | | | STANDARD | | - | PRESENCE | - | PAPER | A5 | CIRCUMSCRIPTION | 150dpi | CMY | 8:8:8 | GAMMA 5 | - | FORMAT 1 |
| PS30 | | LASER PRINTER | STANDARD | P_Laser | - | ABSENCE | - | PAPER | A4 | INSCRIPTION | 600dpi | B/W | - | NO | NO | FORMAT 4 |
| PS40 | | INKJET PRINTER | STANDARD | P_Inc | - | ABSENCE | - | PAPER | A3 | INSCRIPTION | 600dpi | CMY | 2:2:2 | GAMMA 6 | YES | FORMAT 5 |
| PS00 | | STANDARD | STANDARD | P_ | - | PRESENCE | - | PAPER | A4 | INSCRIPTION | 150dpi | B/W | - | NO | NO | FORMAT 6 |
| FS00 | FACSIMILE CONVERSION | STANDARD | STANDARD | | FAX | ABSENCE | - | PAPER | A4 | INSCRIPTION | 180dpi | B/W | - | NO | NO | FORMAT 1 |
| DF00 | STANDARD | STANDARD | STANDARD | | - | PRESENCE | - | DISPLAY | 78×62 | INSCRIPTION | - | B/W | - | NO | NO | FORMAT 1 |

Fig. 25

IMAGE REGISTRATION SYSTEM

The present application is a Continuation Application of U.S. patent application Ser. No. 09/872,008, filed on Jun. 4, 2001 now U.S. Pat. No. 7,965,906, which is based on Japanese patent application No. 2000-167812, filed on Jun. 5, 2000, the entire contents of which is incorporated herein by reference.

BACKGROUND OF THE INVENTION

1. Field of the Invention

The present invention relates to an image registration system, an image registration server, and an image transmission server, and an image registering method and an image transmitting method.

2. Background of the Invention

Systems for uploading image data into image servers through networks have been constructed. In such a system, when an image server is accessed by a personal computer, image data uploaded in the image server is downloaded into the personal computer. An image represented by the downloaded image data is displayed on a display device in the personal computer.

Technical innovation has allowed client computers other than the personal computers to access the image server. It has been possible to display an image represented by the image data downloaded from the image server on a display device in each type of client computer. For example, a portable telephone set, a portable information terminal, or the like can access the image server.

If a device to which a display device having a relatively large screen can be connected accesses the image server, for example, a personal computer, the device is not very unhandy to read an image represented by image data downloaded from the image server even if the size of the image is relatively large.

If a device which accesses the image server has a relatively small display screen, for example, a portable telephone set or a portable information terminal, an image represented by image data transmitted from the image server is relatively larger than the display screen. Accordingly, the image is difficult to see.

Therefore, it is also considered that when the client computer accesses the image server, processing for reducing image data is performed in the image server such that the image data represents an image of a size suitable for a display screen of a display device in the client computer each time the access is made.

Since the processing for reducing the image data is started when the client computer accesses the image server, however, time is required until the transmission of the reduced image data to the client computer from the image server is started. It takes a relatively long time until an image is displayed on the display device in the client computer. Even if the image server is accessed, the image cannot, in some cases, be quickly displayed.

SUMMARY OF THE INVENTION

An object of the present invention is to display an image suitable for a device which has accessed a server relatively quickly.

An image registration system according to the present invention comprises a first client device and a server which can communicate with each other.

The first client device comprises first image data transmission means for transmitting to the server image data to be registered.

The server comprises image data receiving means for receiving the image data transmitted from the first image data transmission means in the first client device, image data generation means for generating image data representing the same image as an image represented by the image data received by the image data receiving means and having a different form of representation therefrom, and image data storage means for storing the image data generated by the image data generation means so as to be accessible.

According to the present invention, the image data to be registered in the server is transmitted to the server from the first client device.

In the server, the image data transmitted from the first client device is received. Consequently, the image data representing the same image as the image represented by the received image data and having a different form of representation therefrom is generated. The generated image data is stored in the server.

Images representing the same image and having different forms of representation mean images representing the same image but differing in color, size, resolution, and a trimming method, the presence or absence of special processing, and so forth. Respective formats for representing the images may differ. Judgment whether or not the images are is the same image may be made by judging whether or not they are considered substantially the same. For example, images representing respective parts of the images can be considered as the same image if they are considered substantially the same.

According to the present invention, the image data representing the same image as the image represented by the image data transmitted from the first client device and having a different form of representation therefrom is stored in the server. Therefore, image data suitable for output (display, printing, etc.) of an output device in the second client device which accesses the server can be transmitted to the second client device from the server. When the second client device accesses the server, the image data suitable for the output of the output device in the second client device is not generated each time the access is made but previously generated. Accordingly, the image data suitable for the output of the output device in the second client device can be immediately transmitted to the second client device. An image represented by the image data can be outputted quickly from the output device in the second client device.

When the server and a second client device can communicate with each other, the image data generation means in the server previously generates image data representing an image which can be outputted by the second client device (for example, the image data is generated before the second client device accesses the server).

For example, the second client device comprises request data transmission means for transmitting to the server request data representing a request to transmit the image data stored in the image data storage means.

In this case, the server further comprises request data receiving means for receiving the request data transmitted from the request data transmission means in the second client device, image data retrieval means responsive to the request data received by the request data receiving means for finding from the image data storage means the image data suitable for image output by the second client device which has transmitted the request data out of the image data stored in the image data storage means in the server, and second image data transmission means for transmitting to the second client device the image data found by the image data retrieval means.

When the request data transmitted from the second client device is received in the server, the image data suitable for the image output by the second client device which has transmitted the request data out of the image data stored in the server is found in response to the request data. The found image data is transmitted to the second client device from the server.

The image data suitable for the output is transmitted to the second client device. Accordingly, it is possible to prevent such a problem that the image represented by the image data transmitted to the output device in the second client device cannot be outputted.

It is preferable that the server further comprises number-of-requests counting means for incrementing the number of transmission requests issued by the second client device in response to the fact that the request data has been received by the request data receiving means.

In this case, the image data generation means in the server may generate image data representing the image represented by the image data received by the image data receiving means in the server and suitable for the image output by the second client device in response to the fact that the counted number by the number-of-requests counting means has reached a predetermined number.

The image data representing the image suitable for the output of the second client device which accesses the server may not, in some cases, be stored in the server. It is also considered that when the server is accessed by the second client device in which the image data representing the image suitable for the output is not stored, the image data suitable for the output of the second client device which has accessed the server is generated each time the access is made. However, this extremely increases the amount of the image data stored in the image server.

The number of requests is counted, and the image data representing the image suitable for the output of the second client device is generated when the number of requests reaches the predetermined number. Consequently, it is possible to prevent the amount of the image data which should be stored in the server from being too increased.

When the number of requests reaches the predetermined number, the image data is generated. Consequently, the image data suitable for the second client device which accesses the server a large number of times can be generated. The image data suitable for the second client device which accesses the server a small number of times may not be generated.

The server comprises a first server and a second server which can communicate with the second client device, for example. The first server comprises the image data receiving means and the request data receiving means, and the second server comprises the image data generation means, the image data storage means, and the second image data transmission means.

The server comprises a first server which can communicate with the second client device and a second server which can communicate with the first server. The first server comprises the image data receiving means, the request data receiving means, and the second image data transmission means, and the second server comprises the image data generation means, the image data storage means, and the image data retrieval means.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 3 illustrates a support information table;

FIG. 25 illustrates an example of a support information table;

DESCRIPTION OF THE PREFERRED EMBODIMENTS

Figure 1:
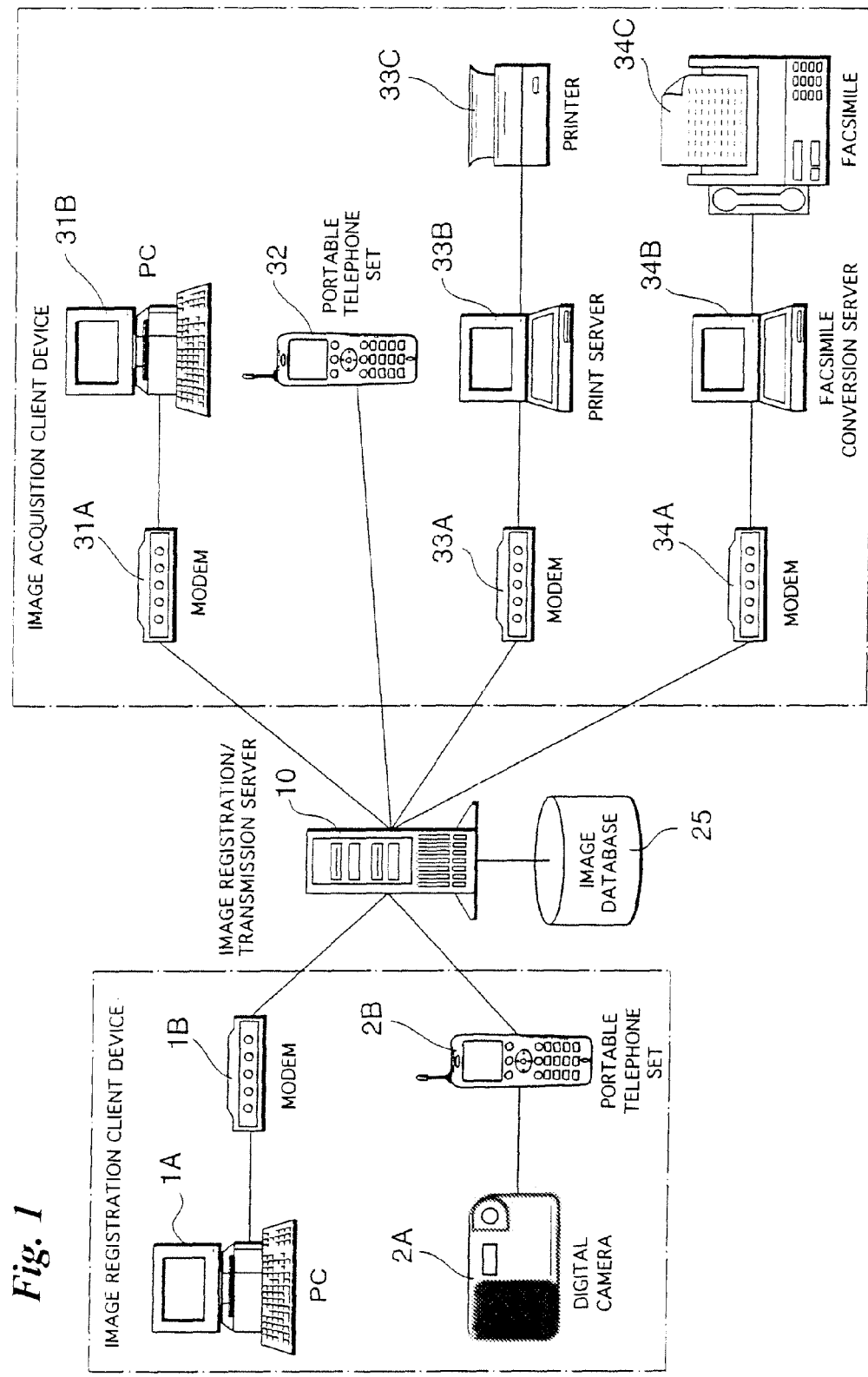
FIG. 1 illustrates the outline of an image registration system.

FIG. 1 illustrates the outline of an image registration system according to an embodiment of the present invention.

The image registration system according to the present embodiment comprises an image registration client device, an image registration/transmission server 10, and an image acquisition client device. An image database 25 storing image data is connected to the image registration/transmission server 10.

The image registration client device transmits image data representing an image to the image registration/transmission server 10. The image acquisition client device issues a request to transmit the image data stored in the image database 25 connected to the image registration/transmission server 10 and receives the image data transmitted in response to the request. The image registration/transmission server 10 performs processing for receiving the image data transmitted from the image registration client device and storing the received image data and processing for transmitting the image data stored in the image database 25 to the image acquisition client device in response to the request from the image acquisition client device.

Both the image registration client device and the image acquisition client device may be ones which can communicate with the image registration/transmission server 10. Examples of the image registration client device include a device comprising a personal computer 1A and a modem 1B and a device comprising a digital camera 2A and a portable telephone set 2B. For example, image data stored in the personal computer 1A is transmitted to the image registration/transmission server 10 through the modem 1B. On the other hand, data representing an image picked up using the digital camera 2A is transmitted to the image registration/transmission server 10 from the portable telephone set 2B.

Examples of the image acquisition client device include a device comprising a modem 31A and a personal computer 31B, a device comprising a potable telephone set 32, a device comprising a modem 33A, a print server 33B and a printer 33C, and a device comprising a modem 34A, a facsimile conversion server 34B and a facsimile machine 34C. The image acquisition client device and the image registration/transmission server 10 are connected to each other by the modem 31A, 33A, 34A, or the portable telephone set 32 in which image data transmitted from the image registration/transmission server 10 is received.

In the image registration system according to the present embodiment, when the image data is transmitted from the image registration client device, the transmitted image data (original image data) is stored, and image data representing substantially the same image as an image represented by the original image data and differing in the type therefrom (e.g., reduced image data) is generated in the image registration/transmission server 10. The image data thus generated is suitable for output (display, printing, etc.) in the image acquisition client device. Therefore, the image can be displayed without performing processing for reducing the image data and so on in the image acquisition client device. Further, the image data which can be outputted in the image acquisition client device is generated, so that such a problem can be prevented that color image data is transmitted and the color image cannot be displayed in the image acquisition client device which can output only gray level image.

Particularly, the image data is not generated when the image acquisition client device accesses the image registration/transmission server 10 but previously generated. The image data suitable for the output of the image acquisition client device can be quickly transmitted to the image acquisition client device.

Figure 2:
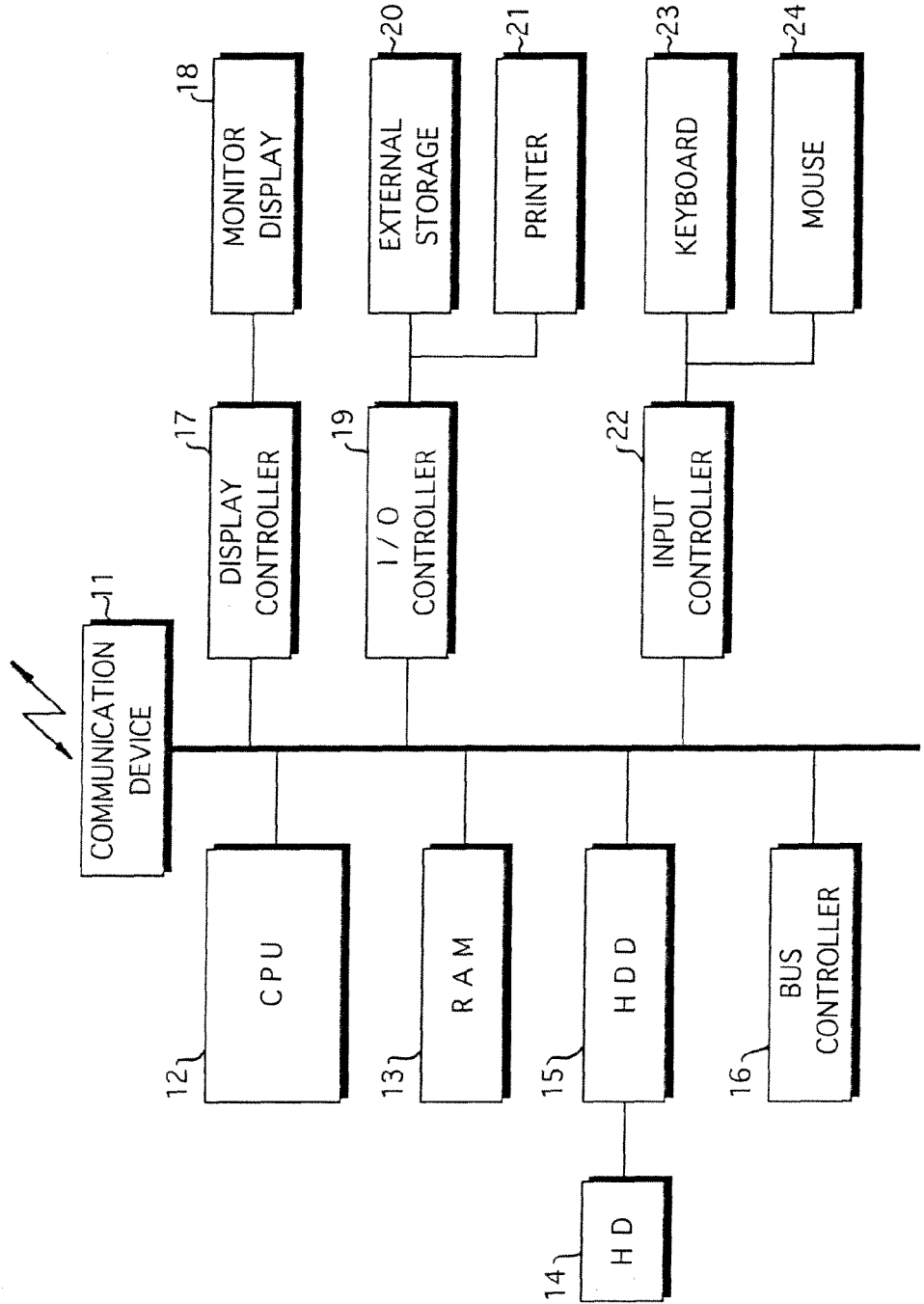
FIG. 2 is a block diagram showing the electrical configuration of an image registration/transmission server.

FIG. 2 is a block diagram showing the electrical configuration of the image registration/transmission server 10.

The overall operation of the image registration/transmission server 10 is supervised by a CPU 12.

The image registration/transmission server 10 comprises a communication device 11 for communicating with the image registration client device and the image acquisition client device, a RAM 13 for temporarily storing data, a hard disk (HD) 14, a hard disk drive 15 for accessing the hard disk 14, and a bus controller 16.

Furthermore, the image registration/communication server 10 comprises a monitor display device 18 for displaying an image, a display controller 17 for controlling the display of the image on the monitor display device 18, an external storage 20 storing the above-mentioned image database 25, a printer 21 for printing the image and other information, an I/O controller 19 for controlling the external storage 20 and the printer 21, a keyboard 23 and a mouse 24 for entering a command or the like, and an input controller 22 for controlling the keyboard 23 and the mouse 24.

FIG. 3 illustrates a support information table.

The support information table stores information including support information for indicating whether or not image data representing an image suitable for output by the image acquisition client device which accesses the image registration/transmission server 10 is stored in the image registration/transmission server 10, and other information.

The following information are stored in the support information table.

Client Code Information:

A client code is for identifying the image acquisition client device and inherent in the image acquisition client device.

Access Device Information:

An access device information indicates the type of the client device which accesses the image registration/transmission server 10. Examples include a personal computer (PC), a portable terminal (including a portable information terminal or a portable telephone set), a print server (a printer), and a facsimile conversion server (a facsimile machine).

System Information:

Client devices of the same type may, in some cases, differ in the system (or form or method). When the client devices are personal computers, for example, they may differ in OS (Operating System). When the client devices are portable telephone sets, they may differ in carriers. The system information thus indicates the system of the client device.

Type Information:

When the client devices are personal computers, for example, they may differ in the type of browser even if they are the same in OS. Printers which are the same in the system may, in some cases, differ in the type. This shall be type information.

Header 1 Information and Header 2 Information

The information specify the above-mentioned type, and correspond to header information included in a client header transmitted to the image registration/transmission server 10 from the image acquisition client device.

Support Information:

The information indicates whether or not image data suitable for the output in the image acquisition client device which accesses the image registration/transmission server 10 is stored in the image database 25. "Presence" is set when the suitable image data is stored in the image database 25, while "Absence" is set when the suitable image data is not stored in the image database 25.

Output Type Information:

The information indicates which of a display device and paper (printer) outputs an image in the image acquisition client device, that is, information about a medium on which an image appears.

Output Size Information:

The information indicates the size of an image outputted in the image acquisition client device.

Trimming Information:

The information indicates a method of trimming an image outputted in the image acquisition client device, and indicates either one of circumscription processing (processing for cutting a peripheral portion of an image in conformity with a frame (for example, paper whose size is determined)) or inscription processing (processing for outputting the whole of an image without changing the aspect ratio of the image).

Output Resolution Information:

The information indicates the resolution of an image outputted in the image acquisition client device.

Color Mode Information:

The information indicates the color mode of an image outputted in the image acquisition client device. There are modes in colors such as RGB (red, green, blue), B/W (a binary value of black and white), gray (having four gray scales), and CMY (cyan, magenta, yellow).

Color Depth Information:

The information indicates the gray scale of an image outputted in the image acquisition client device.

Gamma Correction Information:

The information is for judging whether or not a generated image is subjected to gamma correction and specifying, if it must be subjected to gamma correction, the type of the gamma correction.

Dither Processing Information:

The information indicates whether or not a generated image must be subjected to dither processing. "YES" is described when dither processing must be performed, and "NO" is described when dither processing need not be performed.

Image Format Information:

The information indicates the format of image data representing a generated image.

Such a support information table is stored in the hard disk 14 for the image registration/transmission server 10. The image acquisition client device which accesses the image registration/transmission server 10 transmits the client header including the header information to the image registration/transmission server 10. The client code inherent in the image acquisition client device is found on the basis of the client header transmitted to the image registration/transmission server 10. Consequently, it is found what image data should be transmitted to the image acquisition client device on the basis of the client code.

Figure 4:
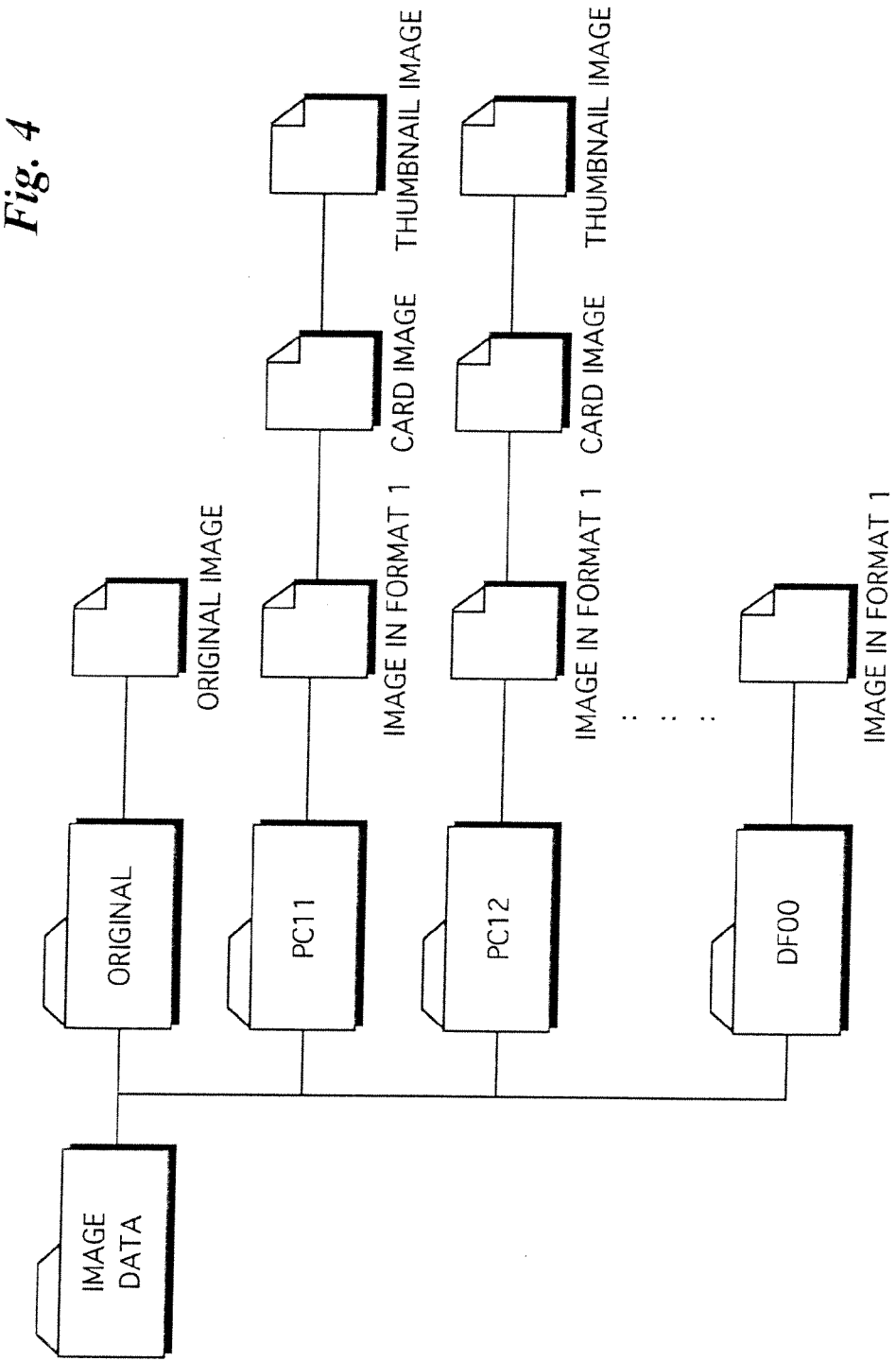
FIG. 4 illustrates the structure of an image folder stored in an image database.

FIG. 4 illustrates the directory structure of the image database 25.

An original holder (an original) stores original image data (an original image file) transmitted from the image registration client device.

In the image database 25, holders respectively corresponding to client codes are formed in addition to the original holder. The holders respectively store image data specified by the corresponding client codes (also store thumbnail image data or card image data, if required).

FIGS. 5 to 9 illustrate examples of an image represented by image data stored in the holder, as described above.

Figure 5:
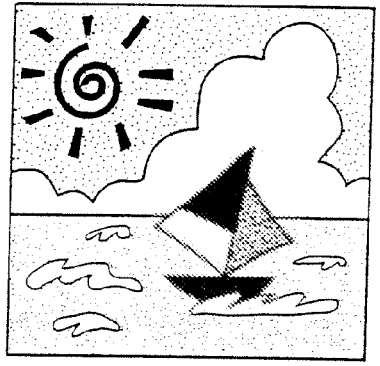
FIG. 5 illustrates an example of an original image.

FIG. 5 is an example of an original image, which has an image size of 1200 pixels by 1200 pixels. The original image is an RGB color image, and has a JPEG (Joint Photographic Coding Experts Group) image format. Original image data representing the original image is transmitted from the image registration client device and therefore, is stored in the original holder.

Figure 6:
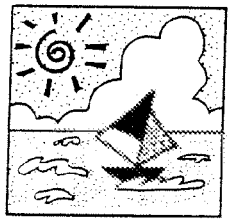
FIG. 6 illustrates an example of an image generated from the original image.

FIG. 6 is an example of an image represented by image data suitable for an image acquisition client device specified by a client code PC11. The image has an image size of 600 pixels by 600 pixels, is an RGB color image, has a format 1 (a JPEG image format), and is subjected to inscription trimming processing.

Figure 7:
FIG. 7 illustrates an example of an image generated from the original image.

FIG. 7 is an example of an image represented by image data suitable for an image acquisition client device specified by a client code PT31. The image has an image size of 64 pixels by 64 pixels, is subjected to dither processing, has a format 2 (a PNG (Portable Network Graphics) image format), and is subjected to inscription trimming processing.

Figure 8:
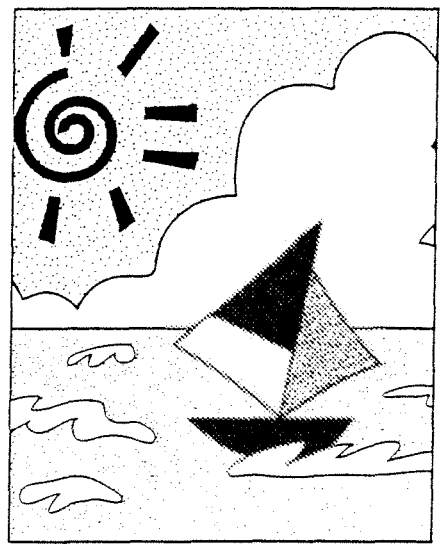
FIG. 8 illustrates an example of an image generated from the original image.

FIG. 8 is an example of an image represented by image data suitable for an image acquisition client device specified by a client code PS21. The image has an image size of 1240 pixels by 1754 pixels, is a CMY color image, has a format 1 (a JPEG image format), and is subjected to circumscription trimming processing.

Figure 9:
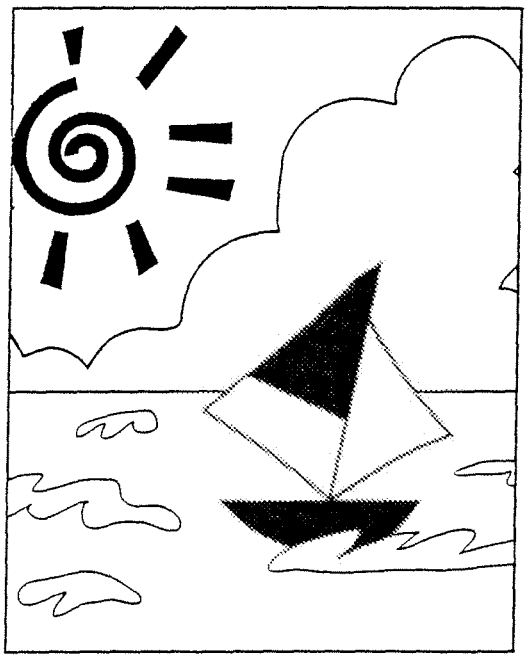
FIG. 9 illustrates an example of an image generated from the original image.

FIG. 9 is an example of an image represented by image data suitable for an image acquisition client device specified by a client code FS00. The image has an image size of 1488 pixels by 2105 pixels, is a gray level image which is not subjected to dither processing, has a format 6 (a TIFF (Tag Image File Format) format), and is subjected to circumscription trimming processing.

Figure 10:
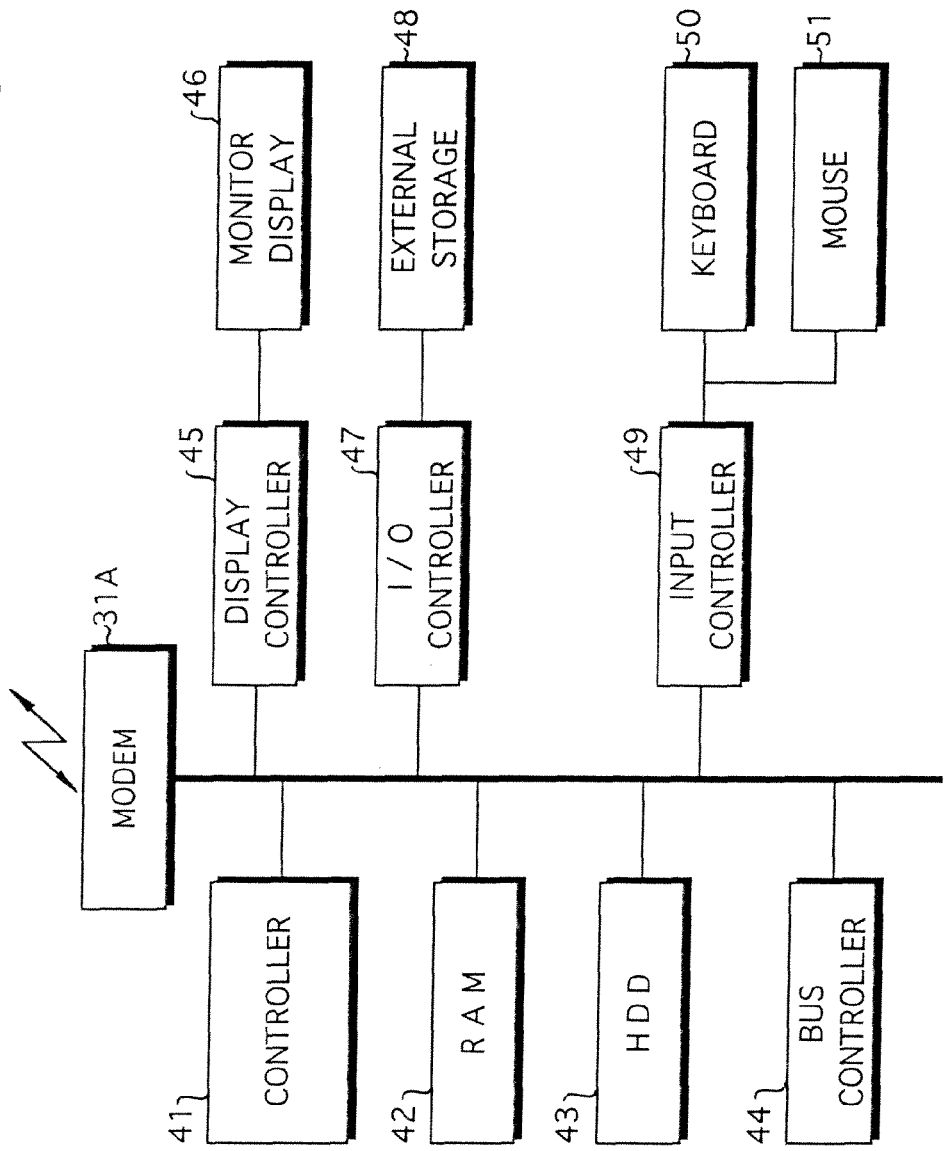
FIG. 10 is a block diagram showing the electrical configuration of a personal computer.

FIG. 10 is a block diagram showing the electrical configuration of the personal computer 31B constituting the image acquisition client device.

In FIG. 10, the modem 31A is also connected to the personal computer 31B.

The overall operation of the personal computer 31B is supervised by a controller 41.

The personal computer 31B comprises a RAM 42 for temporarily storing data, a hard disk drive 43 for accessing a hard disk, and a bus controller 44. The personal computer 31B further comprises a monitor display device 46 for displaying an image, an output controller 45 for controlling the display of the image on the monitor display device 46, an external storage 48, an I/O controller 47 for controlling the external storage 48, a keyboard 50, a mouse 51, and an input controller 49 for controlling the keyboard 50 and the mouse 51.

Figure 11:
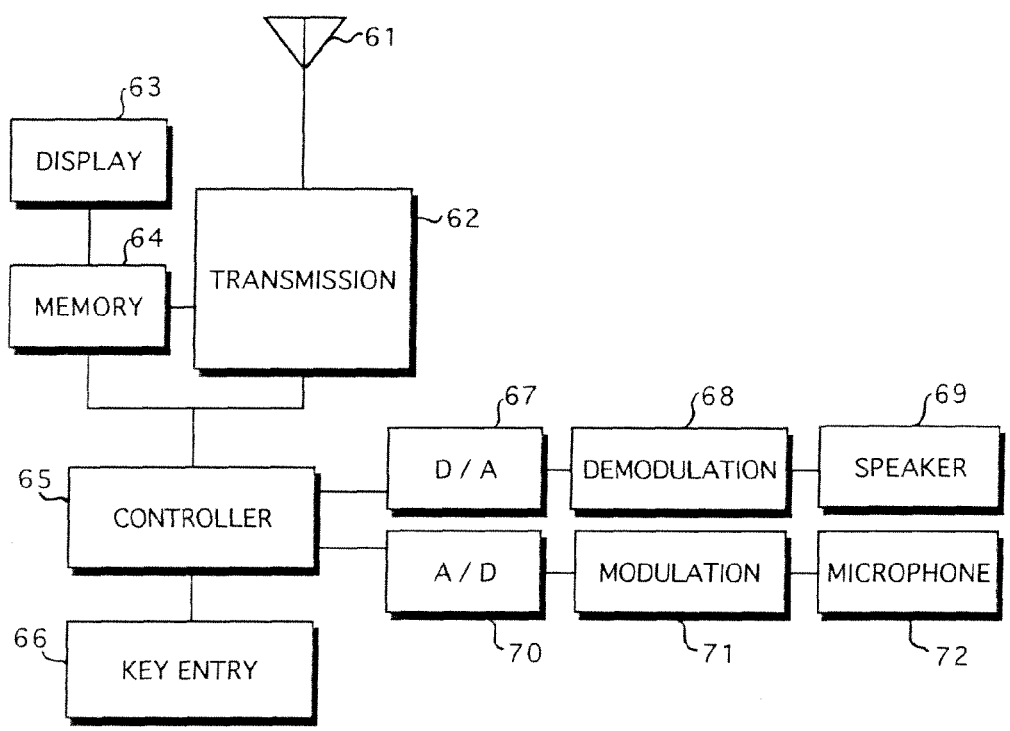
FIG. 11 is a block diagram showing the electrical configuration of a portable telephone set.

FIG. 11 is a block diagram showing the electrical configuration of the portable telephone set 32 which is an example of the image acquisition client device.

The overall operation of the portable telephone set 32 is supervised by a controller 65.

A key entry signal from a key entry section 66 including a ten-key pad of the portable telephone set 32 is inputted to the controller 65.

Voice inputted to a microphone 72 is outputted from the microphone 72 as an audio signal, and the audio signal is fed to a modulation circuit 71. The audio signal is modulated in the modulation circuit 71, and the modulated audio signal is converted into digital audio data in an analog-to-digital conversion circuit 70. The digital audio data is transmitted to a network by an antenna 61 through the controller 65 and a transmission circuit 62. The audio data is transmitted to another communication device, for example, a portable telephone set through the network.

The audio data transmitted to the portable telephone set 32 through the network is received by the antenna 61 and is inputted to the transmission circuit 62. The audio data is inputted to a digital-to-analog conversion circuit 67 through the controller 65, and is converted into an analog audio signal. The analog audio signal is fed to a demodulation circuit 68, and is demodulated therein. The demodulated audio signal is fed to a speaker 69, and voice is outputted from the speaker 69.

The portable telephone set 32 shown in FIG. 11 can also receive image data. The image data is received by the antenna 61, and the received image data is fed to a memory 64 through the transmission circuit 62. The image data is temporarily stored in the memory 64. The image data stored in the memory 64 is fed to a display device 63, so that an image represented by the received image data is displayed on a display screen of the display device 63.

Figure 12:
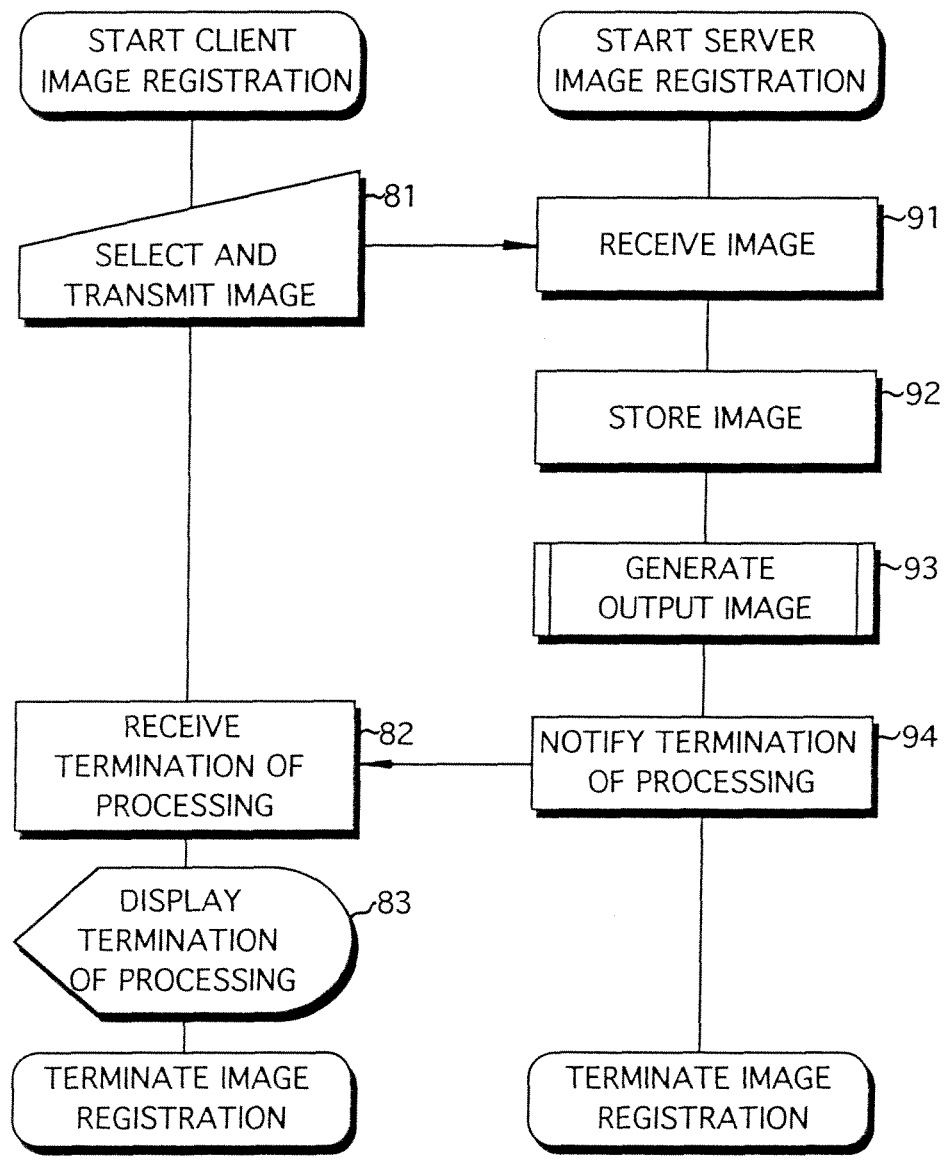
FIG. 12 is a flow chart showing the procedure for image registration processing.

FIG. 12 is a flow chart showing the procedure for processing for transmitting image data to the image registration/transmission server 10 by the image registration client device and registering (storing in the image database 25) the transmitted image data in the image registration/transmission server 10.

In the image registration client device, an image to be transmitted to the image registration/transmission server 10 is selected (step 81). Image data representing the selected image is transmitted to the image registration/transmission server 10 from the image registration client device.

If the image registration client device comprises the personal computer 1A and the modem 1B, for example, image data to be transmitted to the image registration/transmission server 10 is selected out of image data stored in the personal computer 1A, and the selected image data is transmitted to the image registration/transmission server 10 from the modem 1B. If the image registration client device comprises the digital camera 2A and the portable telephone set 2B, image data to be transmitted to the image registration/transmission server 10 is selected out of image data stored in the digital camera 2A. The selected image data is transmitted to the portable telephone set 2B from the digital camera 2A, and is transmitted to the image registration/transmission server 10 by the portable telephone set 2B.

In the communication device 11 in the image registration/transmission server 10, the image data transmitted from the image registration client device is received (step 91). Consequently, the received image data is recorded (stored) on the external storage 20 (the image database 25) as original image data by the I/O controller 19 in the image registration/transmission server 10 (step 92) (the image is stored). When the original image data is stored in the image database 25, output image data suitable for image output in the image acquisition client device is generated from the original image data (step 93). When the output image data is generated, and is stored in the image database 25, data indicating that processing is terminated is transmitted to the image registration client device from the image registration/transmission server 10 (step 94).

The data indicating that processing is terminated, which has been transmitted from the image registration/transmission server 10, is received in the image registration client device (step 82), the termination of processing is displayed on the display device in the image registration client device (step 83). Consequently, processing for registering the image data in the image registration/transmission server 10 by the image registration client device is terminated.

Figure 13:
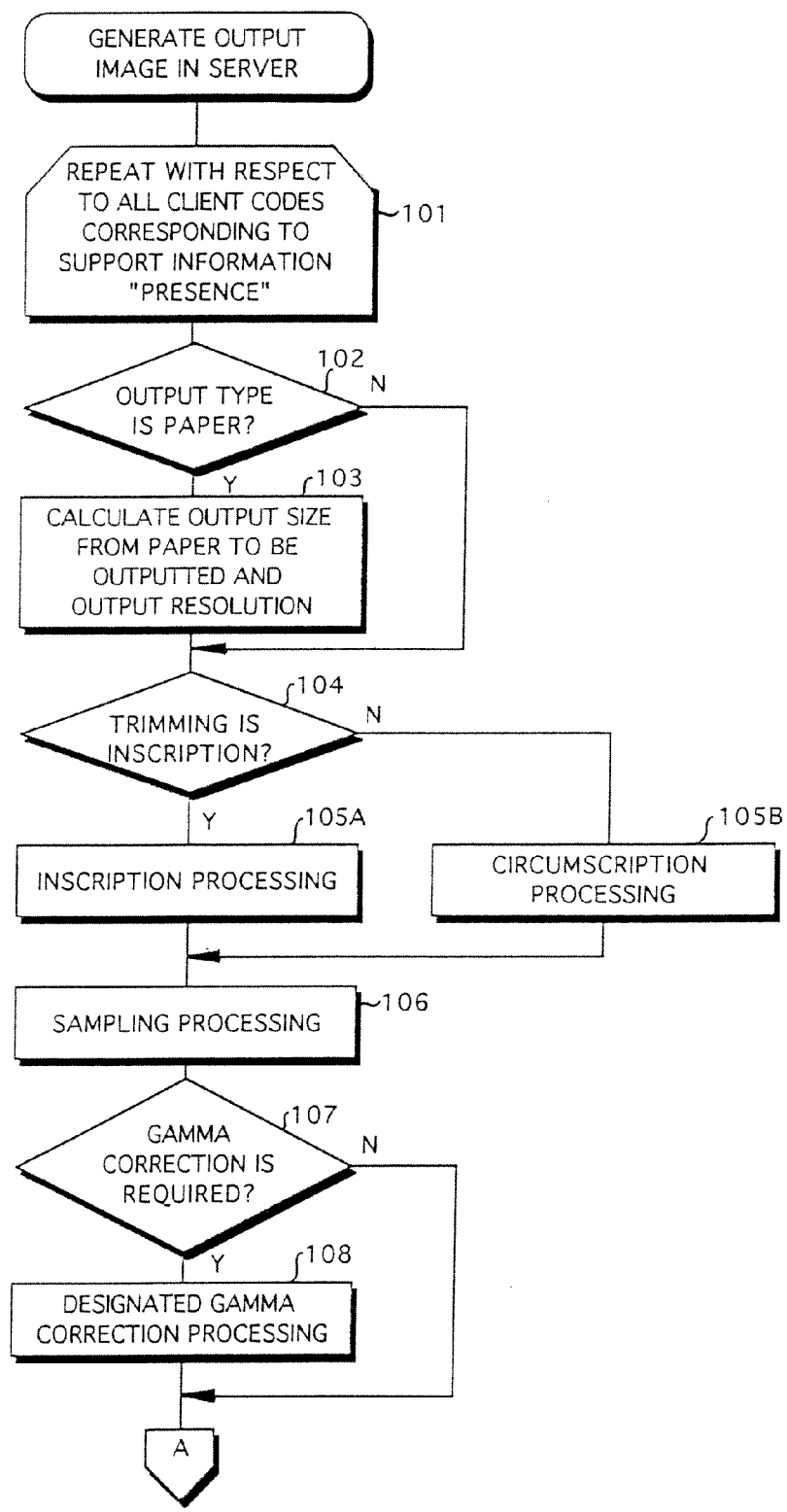
FIG. 13 is a flow chart showing the procedure for image generation processing in a server.
Figure 14:
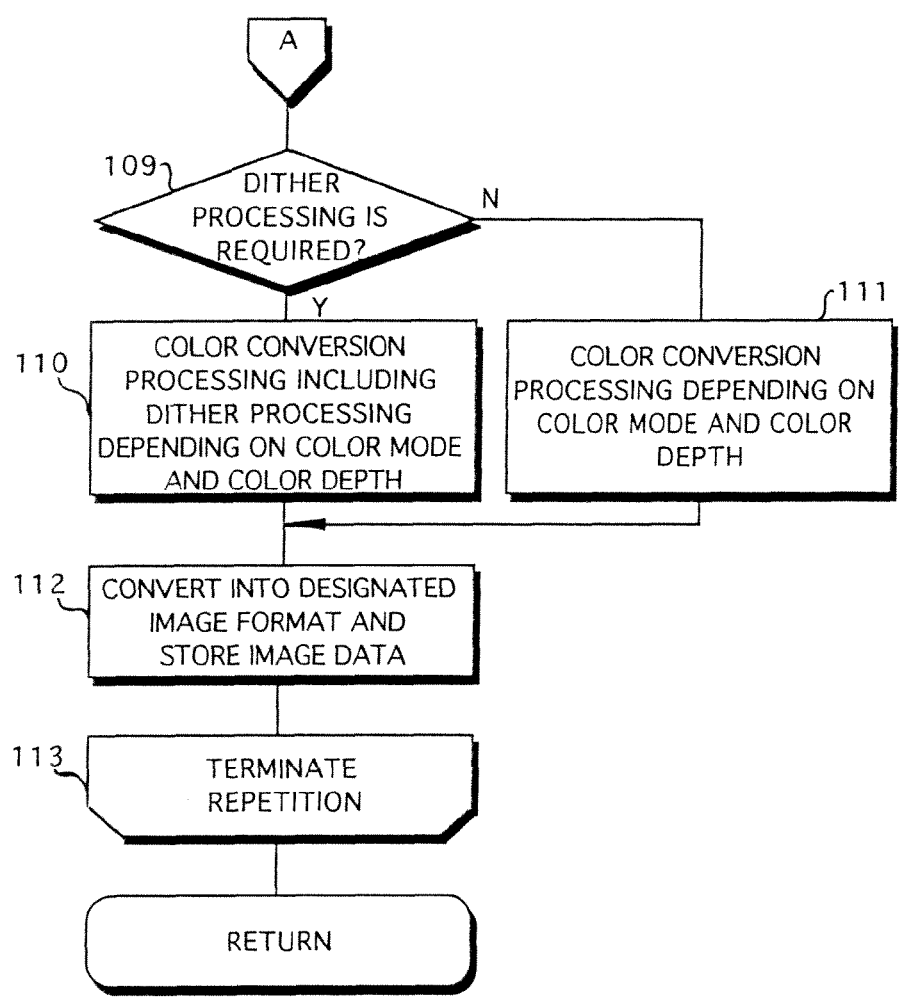
FIG. 14 is a flow chart showing the procedure for image generation processing in the server.

FIGS. 13 and 14 are flow charts showing the procedure for processing for generating an output image in the image registration/transmission server 10 (the processing at the step 93 in FIG. 12).

Processing at the steps 102 to 112 is repeated in order to generate image data suitable for output in an image acquisition client device specified by a client code corresponding to the support information set to "Presence" in the support information table, as described above (steps 101 and 113).

It is first judged whether or not the type of output (output type) is paper (step 102). If it is paper (YES at step 102), the size of an image (an output size) is calculated from the size of the paper to be outputted and the output resolution (step 103). If the output type is not paper (NO at step 102), the processing at the step 103 is skipped.

Then referring to the trimming information, it is checked whether the trimming processing is circumscription or inscription (step 104). If it is inscription (YES at step 104), inscription trimming processing is performed depending on the output size (step 105A). If it is circumscription (NO at step 104), circumscription trimming processing is performed depending on the output size (specifically, in conformity with the size of the paper) (step 105B).

Re-sampling processing is then performed such that the output size is reached (step 106).

Referring to the gamma correction information, it is checked whether or not gamma correction is required (step 107). If the gamma correction is required (YES at step 107), designated gamma correction processing is performed (step 108).

Further referring to the dither processing information, it is checked whether or not dither processing must be performed (step 109). If the dither processing must be performed (YES at step 109), color conversion processing including the dither processing is performed depending on the color mode and the color depth (step 110). If the dither processing need not be performed (NO step 109), the color conversion processing is performed depending on the color mode and the color depth, but the dither processing is not performed (step 111).

Thereafter referring to the image format information, image data is converted into a format designated by the image format information (step 112). It goes without saying that the gamma correction, the dither processing, the format conversion, and so forth are performed by the CPU 12.

The image data thus generated is stored in a holder designated by a corresponding client code, and is stored in the image database 25. Image data representing a thumbnail image (a full color, a JPEG format, and 80 pixels by 80 pixels) and image data representing a card image (a full color, a JPEG format, and 300 pixels by 300 pixels) are also generated, and stored in a holder designated by a client code corresponding to a PC (Personal Computer) serving as an access device. It goes without saying that the thumbnail image data and the card image data are generated by the CPU 12 through thinning processing.

Figure 15:
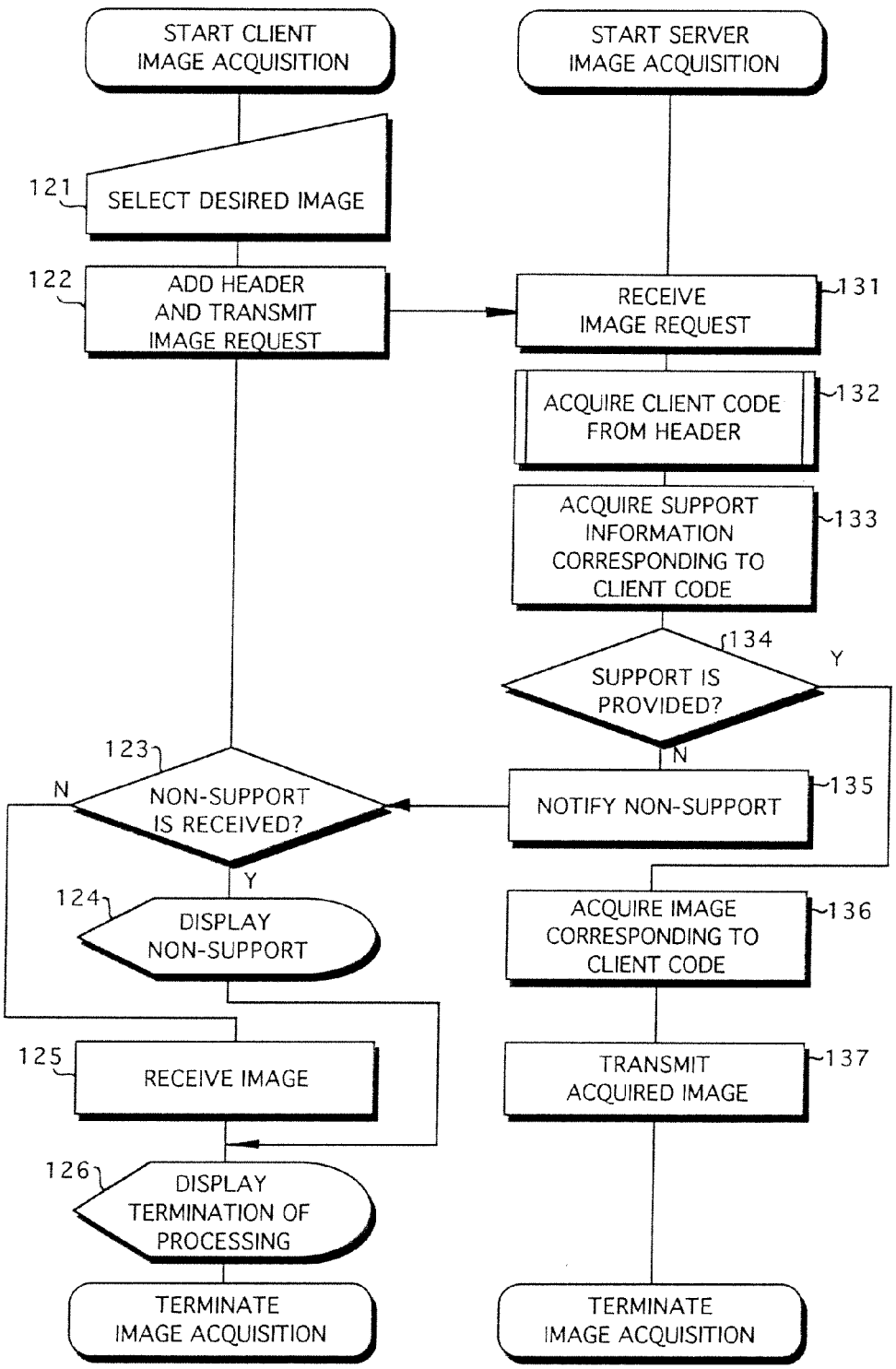
FIG. 15 is a flow chart showing image acquisition processing.

FIG. 15 is a flow chart showing the procedure for processing for the image acquisition client device acquiring image data stored in the image database 25 connected to the image registration/transmission server 10 (downloading image data).

The image acquisition client device shall access the image registration/transmission server 10, and the image acquisition client device and the image registration/transmission server 10 shall be connected to each other.

In the image acquisition client device, a desired image is selected out of images represented by image data stored in the image database 25 (step 121). Of course, a user of the image acquisition client device shall know the contents of the images represented by the image data stored in the image database 25 in advance. The user of the image acquisition client device can select the desired image by performing image retrieval processing in the image registration/transmission server 10, as described later, even when he or she does not know the contents of the images represented by the image data stored in the image database 25 in advance.

When the desired image is selected, data representing a request to transmit the image, data for identifying the image (normally, a file name), and a client header of the image acquisition client device (inherent data for identifying the image acquisition client device) are transmitted to the image registration/transmission server 10 from the image acquisition client device (step 122).

In the image registration/transmission server 10, the data representing the request to transmit the image, the data for identifying the image, and the client header transmitted from the image acquisition client device are received (step 131). A client code for specifying the image acquisition client device is acquired from the support information table on the basis of the received client header (step 132). The processing for acquiring the client code will be described in detail later.

When the client code is found, the support information in the support information table is acquired, to judge the presence or absence of the support information corresponding to the acquired client code (step 133).

When the acquired support information indicates "Presence" (YES at step 134), the image data of the holder specified by the acquired client code out of the image data stored in the image database 25 is acquired from the image database 25 (step 136). The processing for acquiring the image data will be described in detail later. When the image data is acquired from the image database 25, the acquired image data is transmitted to the image acquisition client device from the image registration/transmission server 10 (step 137).

The image data transmitted from the image registration/transmission server 10 is received in the image acquisition client device (step 125). An image represented by the received image data is outputted from the image acquisition client device. If the image acquisition client device comprises a display device (for example, a personal computer, a portable telephone set, etc.), the image represented by the received image data is displayed on the display device. If the image acquisition client device comprises a printing device (for example, a printer, a facsimile, etc.), the image is printed by the printing device. The image data transmitted from the image registration/transmission server 10 is suitable for image output in the image acquisition client device, thereby eliminating the necessity of processing for the image output in the image acquisition client device. In either case, when the output of the image is terminated, the termination of the processing is displayed on the image acquisition client device (step 126).

In the image registration/transmission server 10, the support information corresponding to the client code specifying the image acquisition client device which has issued a request to transmit image data indicates "Absence" (NO at step 134), data representing non-support is transmitted to the image acquisition client device from the image registration/transmission server 10 (step 135). Of course, original image data corresponding to the image whose transmission is requested, data representing a white point of an original image represented by the original image data, and so forth may be transmitted to the image acquisition client device.

In the image acquisition client device, when data representing non-support, which has been transmitted from the image registration/transmission server 10, is received (YES at step 123), the receiving of the data representing non-support is displayed on the display device in the image acquisition client device (step 124). Thereafter, the termination of the processing is displayed (step 126).

Figure 16:
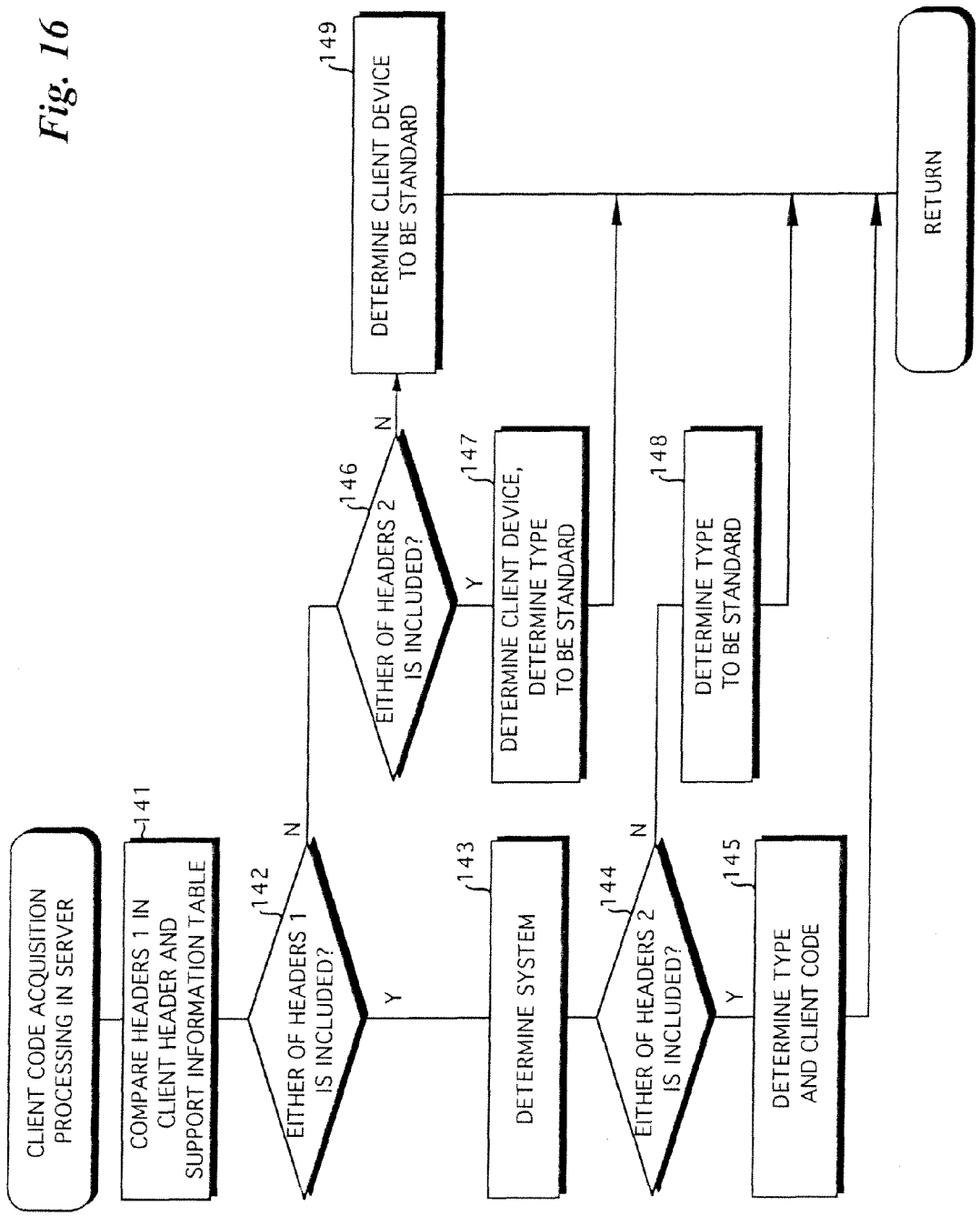
FIG. 16 is a flow chart showing client code acquisition processing in the server.

FIG. 16 is a flow chart showing processing for acquiring a client code in the image registration/transmission server 10 (the processing at step 132 in FIG. 15).

The client header transmitted from the image acquisition client device includes a header 1 and a header 2. The header 1 included in the client header transmitted from the image acquisition client device and the header 1 included in the support information table are compared with each other (step 141). When the comparison indicates that the header 1 included in the header transmitted from the image acquisition client device is included in the support information table (YES at step 142), the system of the image acquisition client device is determined (step 143).

The header 2 included in the client header and the header 2 in the support information table are then compared with each other. When the comparison indicates that the header 2 included in the client header transmitted from the image acquisition client device is included in the support information table (YES at step 144), the type of the image acquisition client device is determined. When the type is determined, the client code inherent in the image acquisition client device is also determined (step 145).

When the header 1 included in the client header is stored in the support information table, but the header 2 is not stored in the support information table (NO at step 144), the type is determined as "Standard" (step 148). A corresponding client code is determined.

Unless the header 1 included in the client header is included in the support information table (NO at step 142), it is confirmed whether or not the header 2 included in the client header is included in the support information table (step 146). When the header 2 included in the client header is included in the support information table (YES at step 146), the access device is determined by the header 2. Further, the header 1 included in the client header is not stored in the support information table, so that the system is determined to be "Standard" (step 147). A corresponding client code is determined.

If neither of the header 1 and the header 2 which are included in the client header is included in the support information table (NO at steps 142 and 146), the access device is determined to be "Standard" (step 149). Consequently, a client code is "DF00".

When the header 1 included in the client header is "Bamboo2.0" (2.0 is a version), and the header 2 included therein is "BB98" (98 is a version), for example, it is found from the header 1 that the system of the image acquisition client device is determined by "OS-1". Further, it is found from the header 2 that the type of the image acquisition client device is "browser-b". The foregoing shows that the client code, specifying the image acquisition client device, corresponding to the header 1 "Banboo2.0" and the header 2 "BB98" which are included in the client header is "PC22".

When the header 1 included in the client header is "NewK-Style", and the header 2 included therein is "C501K", the header 1 is not included in the support information table. Accordingly, the system is not found from the header 1. It is found from the header 2 that the image acquisition client device is a portable terminal. The type is considered to be "Standard" because it is not found. From the foregoing, the client code, specifying the image acquisition client device, corresponding to the header 1 "Newk-Style" and the header 2 "C501K" which are included in the client header is determined to be "PT00".

Figure 17:
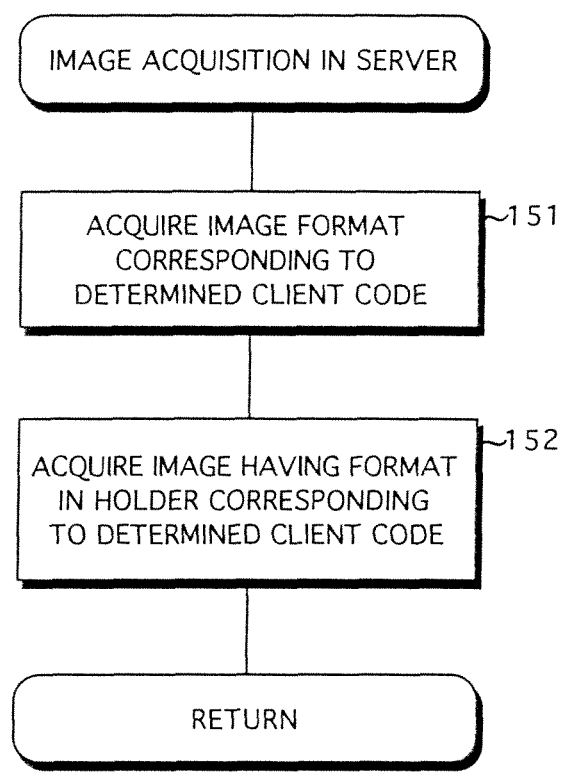
FIG. 17 is a flow chart showing image acquisition processing in the server.

FIG. 17 is a flow chart showing the procedure for image acquisition processing in the image registration/transmission server 10 (processing at step 136 in FIG. 15).

When the client code for specifying the image acquisition client device is determined in the above-mentioned manner, an image format corresponding to the client code is acquired from the support information table (step 151). A holder corresponding to the client code is found from the image database 25. Image data having an image format corresponding to the acquired image format out of image data stored in the found holder is acquired (step 152).

If the support information indicates "Presence", the image data thus acquired is transmitted to the image acquisition client device from the image registration/transmission server 10 in the above-mentioned manner.

In either case, the image data suitable for the image acquisition client device which has accessed the image registration/transmission server 10 out of the image data stored in the image database 25 is transmitted to the image acquisition client device from the image registration/transmission server 10. Instead of generating image data suitable for the image acquisition client device and transmitting the generated image data to the image acquisition client device when the image acquisition client device accesses the image registration/transmission server 10, image data suitable for a plurality of image acquisition client devices are previously generated, the image data suitable for the image acquisition client device out of the image data is transmitted to the image acquisition client device from the image registration/transmission server 10. Accordingly, the image data suitable for the image acquisition client device can be quickly transmitted to the image acquisition client device from the image registration/transmission server 10.

FIGS. 18 to 21 illustrate, in a case where the image acquisition client device is the modem 31A and the personal computer 31B, an example of a window displayed on a display screen of a display device in the personal computer 31B.

Figure 18:
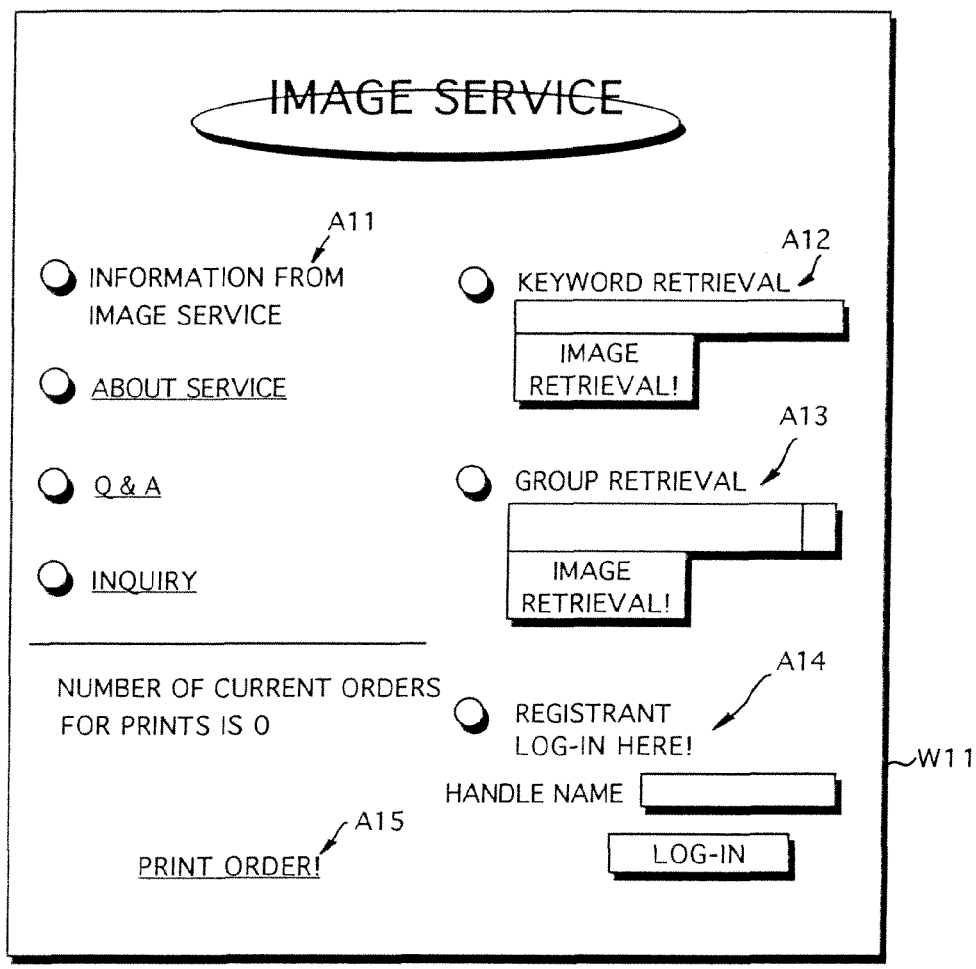
FIG. 18 is an example of a window displayed on a personal computer.

When the personal computer 31B accesses the image registration/transmission server 10 using the modem 31A, an initial window W11 shown in FIG. 18 is displayed on the display screen of the display device 46 in the personal computer 31B. The initial window W11 includes the following areas (buttons).

Service Content Display Area A11:

Contents relating to a service provided for the image acquisition client device by the image registration/transmission server 10 are displayed thereon. When a sentence or the like displayed on the area is clicked, a transmission command indicating the contents of the sentence is transmitted to the image registration/transmission server 10. Data corresponding to the transmission command is transmitted to the image registration client device from the image registration/transmission server 10, so that a new window is displayed.

Keyword Retrieval Area A12:

A keyword for retrieving image data stored in the image database 25 is entered thereinto. When an image retrieval area under the keyword retrieval area A12 is clicked after the keyword is entered into the keyword retrieval area A12, data representing the entered keyword is transmitted to the image registration/transmission server 10 from the image acquisition client device. In the image registration/transmission server 10, image data corresponding to the keyword is retrieved.

Group Retrieval Area A13:

In a case where images are divided into groups, a group keyword is entered thereinto when the group is designated to retrieve image data. When the group retrieval area A13 is pulled down, group keywords appear, and the desired group keyword is selected. When an image retrieval area under the group retrieval area A13 is clicked, data representing the selected group keyword is transmitted to the image registration/transmission server 10 from the image acquisition client device. In the image registration/transmission server 10, image data is retrieved in accordance with the group keyword.

Image Registrant Input Area A14:

A handle name of a user is entered thereinto when the image data is transmitted to the image registration/transmission server 10, as described above.

Print Order Area A15:

The area is for giving a print order command. A window for ordering prints is displayed by clicking the area.

Figure 19:
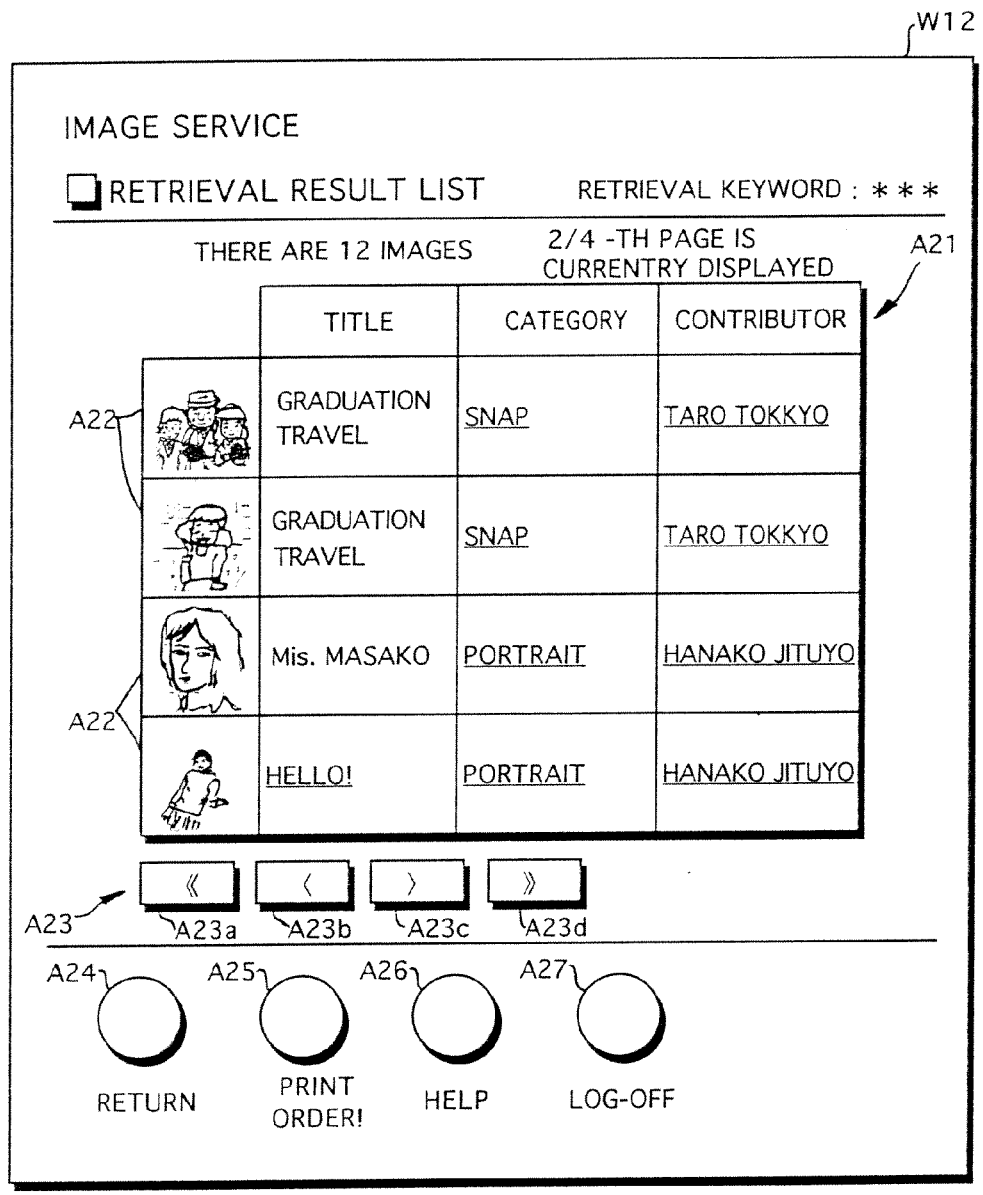
FIG. 19 is an example of a window displayed on the personal computer.

In the initial window W11, a keyword shall be entered into the keyword retrieval area A12. Consequently, data representing the keyword is transmitted to the image registration/transmission server 10 from the image acquisition client device, as described above, where image data retrieval processing is performed. As a result of the retrieval, the found image data shall be transmitted to the image acquisition client device from the image registration/transmission server 10. Consequently, a retrieval result list window W12 as shown in FIG. 19 is displayed on the display screen of the display device 46 in the personal computer 31B.

The retrieval result list window W12 includes the following areas. The retrieval result list window W12 is obtained by the keyword retrieval. When the group retrieval processing is performed, another retrieval result list window is displayed.

Retrieval Result Display Table A21:

The table includes a thumbnail image(s) obtained as a result of retrieval (an area A22), the title of the thumbnail image, a category including the thumbnail image, and a handle name of a user (contributor) which has transmitted an original image of the thumbnail image to the image registration/transmission server 10. It goes without saying that the thumbnail image displayed on the area A22 originates from the image data which represents the thumbnail image and is suitable for display on the image acquisition client device which has accessed the image registration/transmission server 10 and is read out of the image database 25, as described above, and is transmitted to the image acquisition client device. When the thumbnail image included in the thumbnail image area A22 is clicked, a card image display window for displaying a card image a size larger than the thumbnail image is displayed.

Frame Feed/Frame Return Button A23:

The button includes a fast return button A23a for issuing a command to return a plurality of frames of the thumbnail images displayed on the retrieval result display table A21 at a time, a frame return button A23b for issuing a command to return one frame of the thumbnail image, a frame feed button A23c for issuing a command to feed one frame of the thumbnail image, and a fast feed button A23d for issuing a command to feed a plurality of frames of the thumbnail images at a time.

Return Button A24:

The button is clicked by the user at the time of return from the retrieval result list window W12 to the previous window W11.

Print Order Button A25:

The button is clicked when prints of an original image corresponding to the thumbnail image displayed on the retrieval result display table A21 are ordered. When the button A25 is clicked, a print order window is displayed. The prints are ordered in accordance with the window.

Help Button A26:

The button is clicked by the user when an operating method is not found.

Log-off Button A27:

The button is clicked by the user when the retrieval result list window W12 is logged off.

Figure 20:
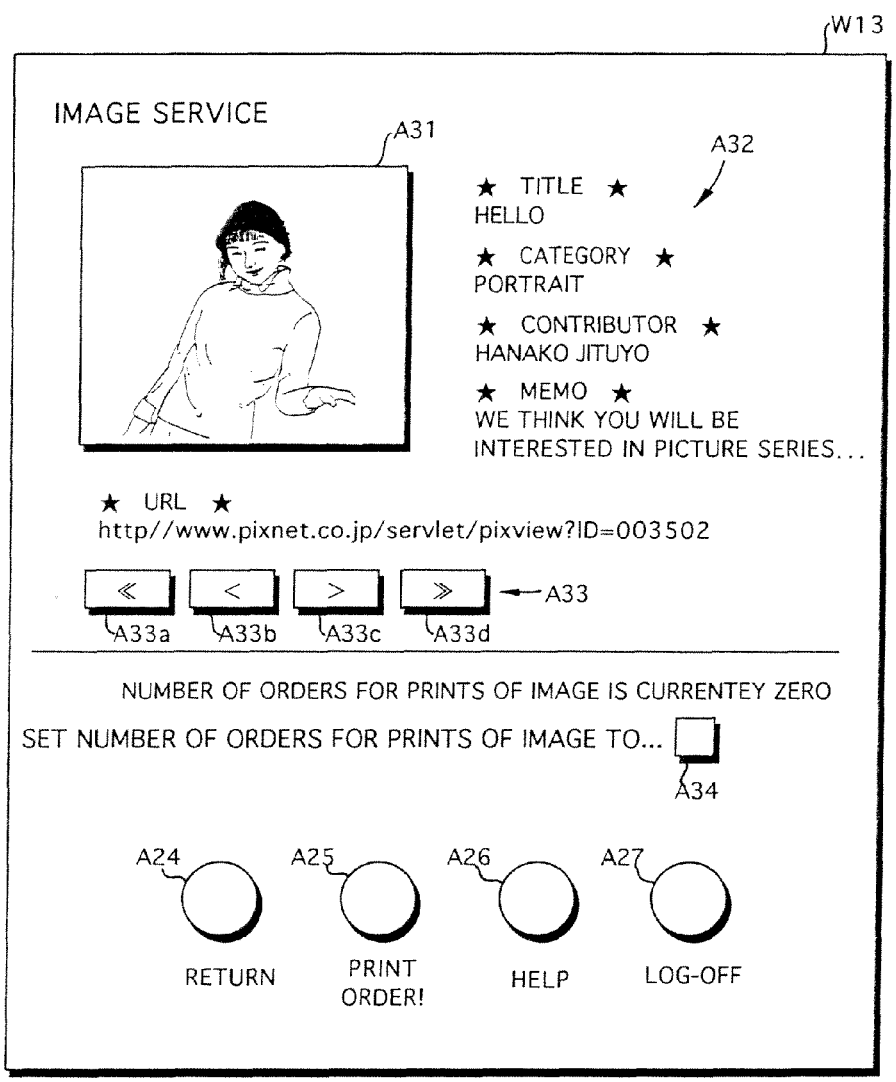
FIG. 20 is an example of a window displayed on the personal computer.

FIG. 20 illustrates an example of the card image display window W13.

The thumbnail image in the thumbnail image area A22 in the retrieval result list window W12 is clicked, so that the corresponding card image display window W13 is displayed, as described above. The card image display window W13 includes the following areas.

Card Image Display Area A31:

The area is one to display a card image which corresponds to the thumbnail image clicked by the user and has a size larger than the thumbnail image. Card image data suitable for display on the image acquisition client device which has accessed the image registration/transmission server 10 is transmitted from the image registration/transmission server 10, so that the card image is displayed. When the card image displayed on the card image display area A31 is clicked, an image display window corresponding to the card image is displayed on the display screen of the display device 46 in the personal computer 31B constituting the image acquisition client device.

Card Image Information Display Area A32:

Information relating to the card image displayed on the card image display area A31 is displayed thereon. The title of the image, a category including the image, a person who has transmitted the image, a memo on the image, and URL (Uniform Resource Locator) in a case where the image is directly accessed are displayed thereon.

Frame Return/Frame Feed Button A33:

The button includes a plural frames return button A33a clicked when the card image of a frame which is a plurality of frames preceding a frame including the card image displayed on the card image display area A31 out of the images found by the retrieval is displayed on the card image display area A31, a frame return button A33b clicked when the card image of the preceding frame is displayed on the card image display area A31, a frame feed button A33c clicked when the card image of the succeeding frame is displayed on the card image display area A31, and a plural frames feed button A33d clicked when the card image of a frame which is a plurality of frames succeeding a frame including the card image is displayed on the card image display area A31.

Furthermore, the card image display window W13 includes a return button A24, a print order button A25, a help button A26, and a log-off button A27, similarly to the retrieval result list window W12.

Figure 21:
FIG. 21 is an example of a window displayed on the personal computer.

As described in the foregoing, the card image displayed on the card image display area A31 is clicked, so that an image display window W14 shown in FIG. 21 is displayed on the display screen of the display device 46.

An image, suitable for display on the personal computer 31B, which is generated on the basis of the original image data transmitted to the image registration/transmission server 10 is displayed on the image display window W14.

When the window W14 is small, an image which is not seen on the window W14 can be seen by scrolling a scroll bar A41. Of course, the size of the window W14 itself may be enlarged.

When the image registration/transmission server 10 is accessed utilizing the personal computer 31B, as described above, image data representing the image suitable for the display on the personal computer 31B is transmitted from the image registration/transmission server 10. Moreover, instead of not generating the image data suitable for the display on the personal computer 31B until the personal computer 31B accesses the image registration/transmission server 10, image data suitable for the personal computer 31B are previously generated, and the image data suitable for the personal computer 31B out of the generated image data is transmitted to the personal computer 31B from the image registration/transmission server 10. Accordingly, the image can be quickly displayed.

Figure 22:
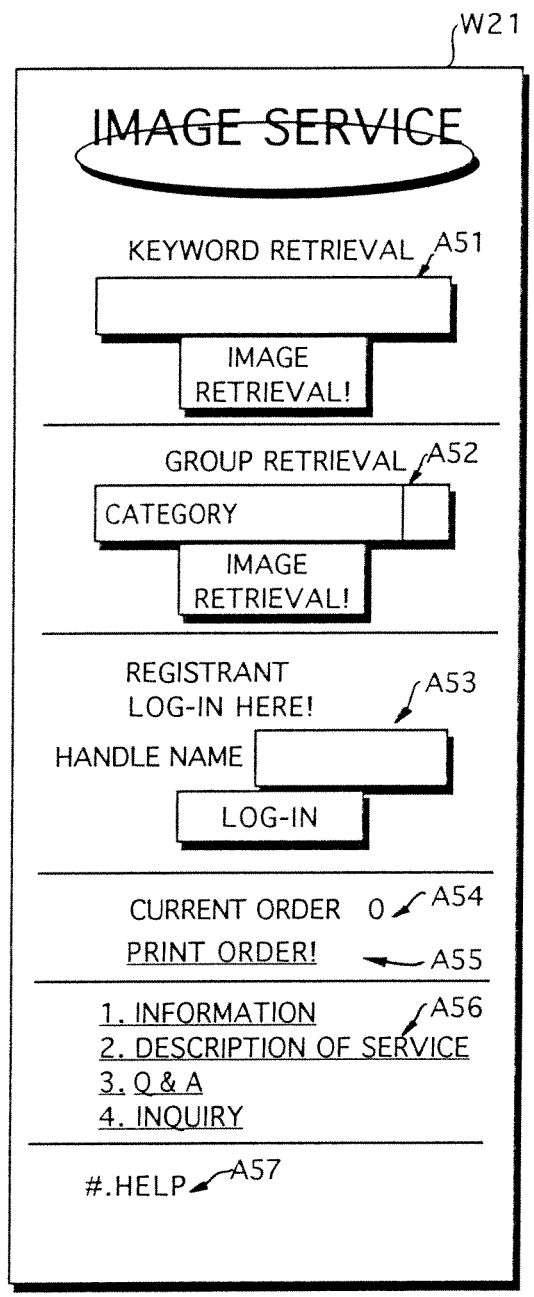
FIG. 22 is an example of a window displayed on a portable telephone set.
Figure 23:
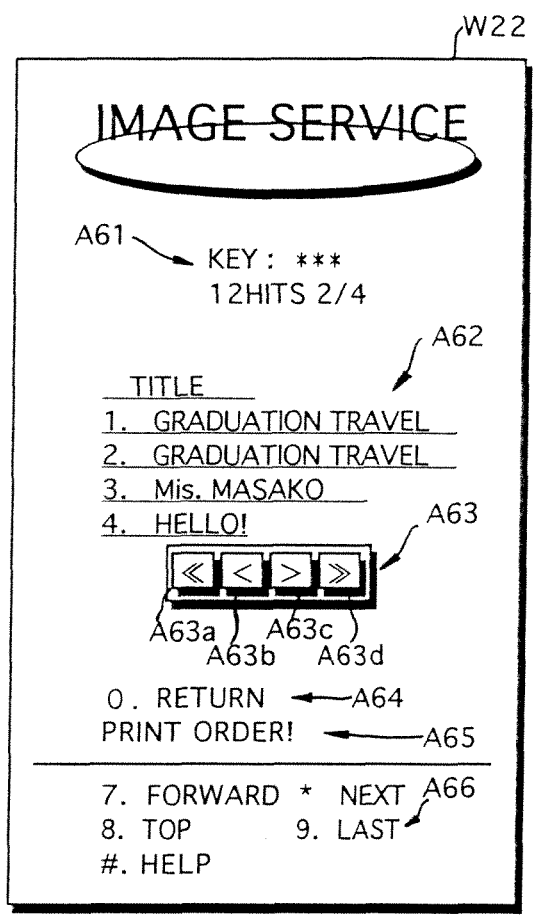
FIG. 23 is an example of a window displayed on the portable telephone set.
Figure 24:
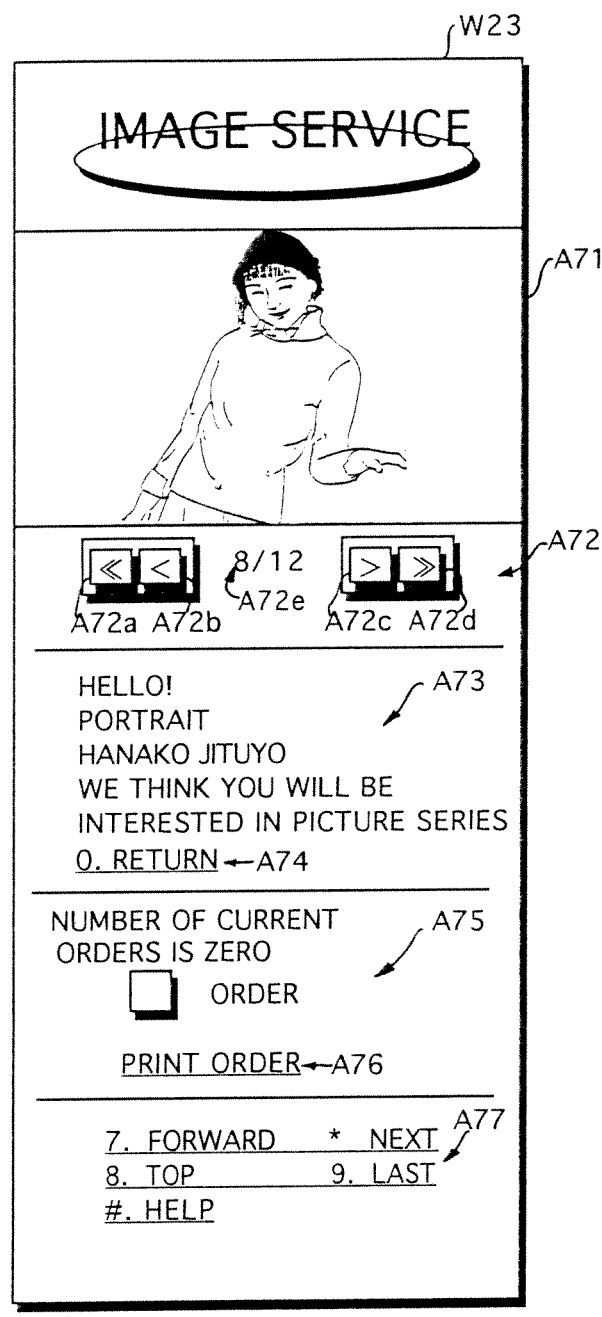
FIG. 24 is an example of a window displayed on the portable telephone set.

FIGS. 22 to 24 illustrate, in a case where the image acquisition client device which accesses the image registration/transmission server 10 is the portable telephone set 32, an example of a window displayed on the portable telephone set 32.

FIG. 22 is an example of an initial window W21 displayed when the image registration/transmission server 10 is accessed using the portable telephone set 32.

The initial window W21 includes the following areas.

Keyword Retrieval Area A51:

A keyword for retrieving an image is entered thereinto. When an image retrieval area under the keyword retrieval area A51 is designated by a key entry section of the portable telephone set 32, an image is retrieved by the entered keyword.

Group Retrieval Area A52:

A keyword relating to a category for retrieving an image is entered thereinto. When the area is pulled down, categories appear. The desired category is selected out of the categories which have appeared.

Registrant Log-in Area A53:

A handle name is entered thereinto when the image registration/transmission server 10 is accessed for transmitting image data thereto.

Number-of-Orders Display Area A54:

The number of orders for prints of an image is displayed thereon.

Print Order Area A55:

The area is designated by a user when prints of an image are ordered.

Service information display area A56:

The area is designated when information on an image service provided by the image registration/transmission server 10, description of the service, questions and answers, and an inquiry about the image service are displayed.

HELP Area A57:

The area is designated when a method of utilizing the image service is not found.

When a keyword is entered into the keyword retrieval area A51 in the initial window W21, data representing the keyword is transmitted to the image registration/transmission server 10 from the portable telephone set 32.

In the image registration/transmission server 10, an image is retrieved by the transmitted keyword. Data representing the title of the image found as a result of the retrieval is transmitted to the portable telephone set 32 from the image registration/transmission server 10. Consequently, a retrieval result display window W22 shown in FIG. 23 is displayed on the display screen of the display device 63 in the portable telephone set 32.

The retrieval result display window W22 includes the following areas.

Number-of-Hits Display Area A61:

The number of images found as a result of the image retrieval is displayed thereon. A keyword used for the retrieval and a page number indicating what number of all pages is a page on which the image having a title displayed on the window W22 is found are also displayed.

Title Display Area A62:

The titles of the images found as a result of the image retrieval are displayed thereon. When any of the titles is designated, a window including an image having the designated title is displayed on the display screen of the portable telephone set 32.

Page Return/Page Feed Button Display Area A63:

The area includes, in a case where the title of the image found as a result of the image retrieval is displayed over a plurality of pages, a first page return button A63a designated when the title of the image on the first page is displayed on the title display area A62, a one page return button A63a designated when the title of the image on the preceding page is displayed, a one page feed button A63c designated when the title of the image on the succeeding page is displayed, and a last page feed button A63d designated when the title of the image on the last page is displayed.

Return Area A64:

The area is designated when the window is returned to the preceding window.

Print Order Area A65:

The area is designated when prints of the image are ordered.

Page Designation Area A66:

The area includes, in a case where the title of the image found as a result of the image retrieval is displayed over a plurality of pages, characters, i.e., "7. Forward" designated when the title of the image on the preceding page is displayed, "*Next" designated when the title of the image on the succeeding page is displayed, "8. Top" designated when the top (first) page is displayed, "9. Last" designated when the last page is displayed, and "#Help" designated when a help information window is displayed.

FIG. 24 is an image window W23 displayed when "4. Hello" in the title display area A62 in the window W22 shown in FIG. 23 is designated.

The image window W23 includes the following areas.

Image Display Area A71:

An image having a designated title is displayed thereon. When the title is designated, as described above, data representing the designated title is transmitted to the image registration/transmission server 10 from the portable telephone set 32. Consequently, the image database 25 is searched for image data having the title and suitable for display on the portable telephone set 32 which has issued a transmission request in the above-mentioned manner. The image data searched for is transmitted to the portable telephone set 32 from the image registration/transmission server 10. An image suitable for the display on the portable telephone set 32 is displayed on the display device 63 in the portable telephone set 32. Images which can be displayed on the portable telephone set 32 are generally limited depending on the type of the portable telephone set 32. However, data representing the image suitable for the display on the portable telephone set 32 is transmitted from the image registration/transmission server 10.

Frame Return/Frame Feed Button Area A72:

The area includes, in a case where a plurality of images are found as a result of the retrieval, a button A72a designated when the first image is displayed on the image display area A72, a button A72b designated when the image in the preceding frame is displayed on the image display area A72, a button A72c designated when the image in the succeeding frame is displayed on the image display area A72, and a button A72d designated when the last image is displayed on the image display area A72. Further, it also includes an area A72e indicating what number of the images found as a result of the retrieval is displayed on the image display area A72.

Image Information Display Area A73:

Information relating to the image displayed on the image display area A71 is displayed thereon. The title of the image, a category including the image, a handle name of a contributor of the image, and a memo on the image are displayed thereon.

Return Area A74:

The area is designated when the window is returned to the preceding window.

Number-of-Orders Designation Area A75:

The number of orders is entered thereinto.

Print Order Area A76:

The area is for issuing a print order command.

Page Designation Area A77:

The area includes, in a case where a plurality of images are found as a result of the retrieval, characters, i.e., "7. Forward" designated when the image in the preceding frame is displayed on the image display area A71, "* Next" designated when the image in the succeeding frame is displayed, "9. Top" designated when the top (first) image is displayed, "9. Last" designated when the last image is displayed, and "# Help" designated when a help window is displayed, similarly to the above-mentioned frame return/frame feed button A72.

Even when the image acquisition client device which accesses the image registration/transmission server 10 is thus the portable telephone set 32, the image database 25 is searched for image data suitable for the display on the portable telephone set 32. The image data searched for is transmitted to the image acquisition client device from the image registration/transmission server 10. It will be easily understood that when the image acquisition client device utilizes a printer, a facsimile, or the like, the image database 25 is searched for image data suitable for printing in the printer, the facsimile, or the like, and the image data searched for is transmitted to the image acquisition client device from the image registration/transmission server 10.

In either case, the image data corresponding to the type of the image acquisition client device, for example, is previously stored in the image database 25. Accordingly, the image data suitable for the image acquisition client device can be quickly transmitted to the image acquisition client device.

FIG. 25 illustrates another example of a support information table stored in the hard disk for the image registration/transmission server 10.

The support information table shown in FIG. 3 is used for such a operation that when the image acquisition client device in which the support information indicates "Presence" accesses the image registration/transmission server 10, image data suitable for display on the image acquisition client device is transmitted, and when the image acquisition client device in which the support information indicates "Absence" accesses the image registration/transmission server 10, data indicating non-support is transmitted but the image data is not transmitted to the image acquisition client device. Unless the contents of the support information table are rewritten, the data indicating non-support is returned even if the image acquisition client device in which the support information indicates "Absence" accesses the image registration/transmission server 10 many times.

Contrary to this, in the following example, the number of times of access of the image acquisition client device in which support information indicates "Absence" to the image registration/transmission server 10 is counted, and the support information is changed from "Absence" to "Presence" when the counted number reaches not less than a predetermined number. When it is judged that an image acquisition client device, which need not conceivably be supported at the beginning of construction of the support information table, must be supported due to the increase in the number of times of access, image data suitable for the image acquisition client device is generated.

In the support information table shown in FIG. 25, the contents of the support information are changed, and request information is newly added, as compared with the support information table shown in FIG. 3.

As the support information, threshold information (for example, R200) represented by a letter "R" and a number in addition to "Presence" and "Absence" is defined. A number succeeding the letter R representing the threshold information indicates a threshold value. When requests whose number exceed the threshold value are issued from the image acquisition client device, the support information for the image acquisition client device is changed into "Presence".

The request information represents the number of requests, that is, the number of times of access of the image acquisition client device in which the threshold information is defined in the support information to the image registration/transmission server 10. When the number of times of access exceeds the threshold, the support information is switched into "Presence", as described above.

Figure 26:
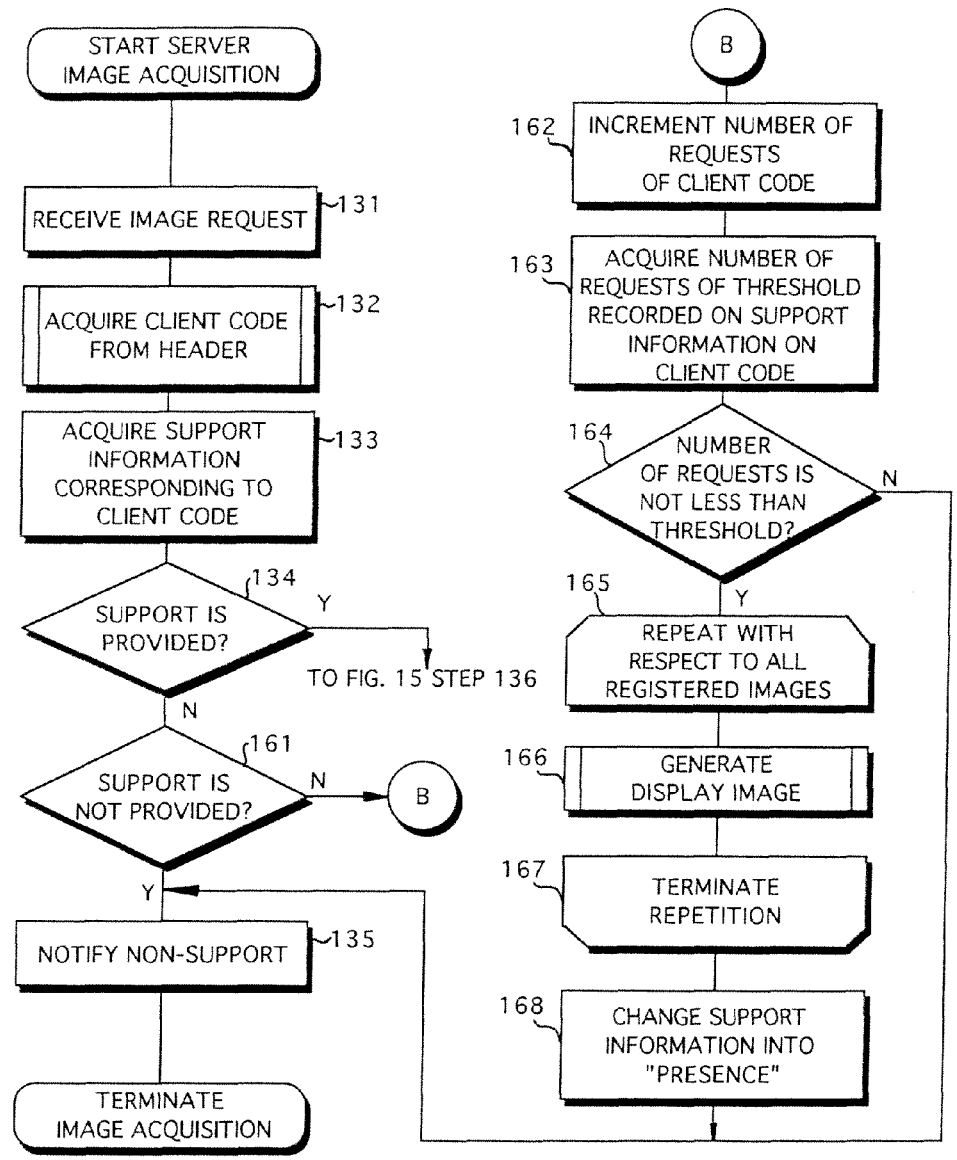
FIG. 26 is a flow chart showing image acquisition processing in the server.

FIG. 26 is a flow chart showing the procedure for image acquisition processing in the image registration/transmission server 10. The processing corresponds to the processing in the server shown in FIG. 15. The same processing steps as the processing steps shown in FIG. 15 are assigned to the same reference numerals and hence, the description thereof is not repeated.

It is confirmed whether or not support is provided while referring to the support information in the support information table. When it is judged that support is not provided (NO at step 134), it is further judged whether or not support is not provided (the threshold information is not described) (step 161).

If the answer is in the negative at both the steps 134 and 161, the threshold information is stored in the support information, as described above. When access the number of times of which exceeds the threshold defined by the threshold information is made, it is considered that the support information is changed into "Presence". Therefore, the number of requests of request information relating to a corresponding client code is incremented (rewritten) (step 162). The threshold information stored in the support information relating to the corresponding client code is then acquired from the support information table (step 163).

It is confirmed whether or not the number of requests reaches not less than the threshold (step 164). When it reaches not less than the threshold (YES at step 164), image data representing a display image suitable for display on the image acquisition client device is generated, as shown in FIG. 13 (steps 165, 166 and 167). Further, the support information is changed into "Presence" (step 168).

Figure 27:
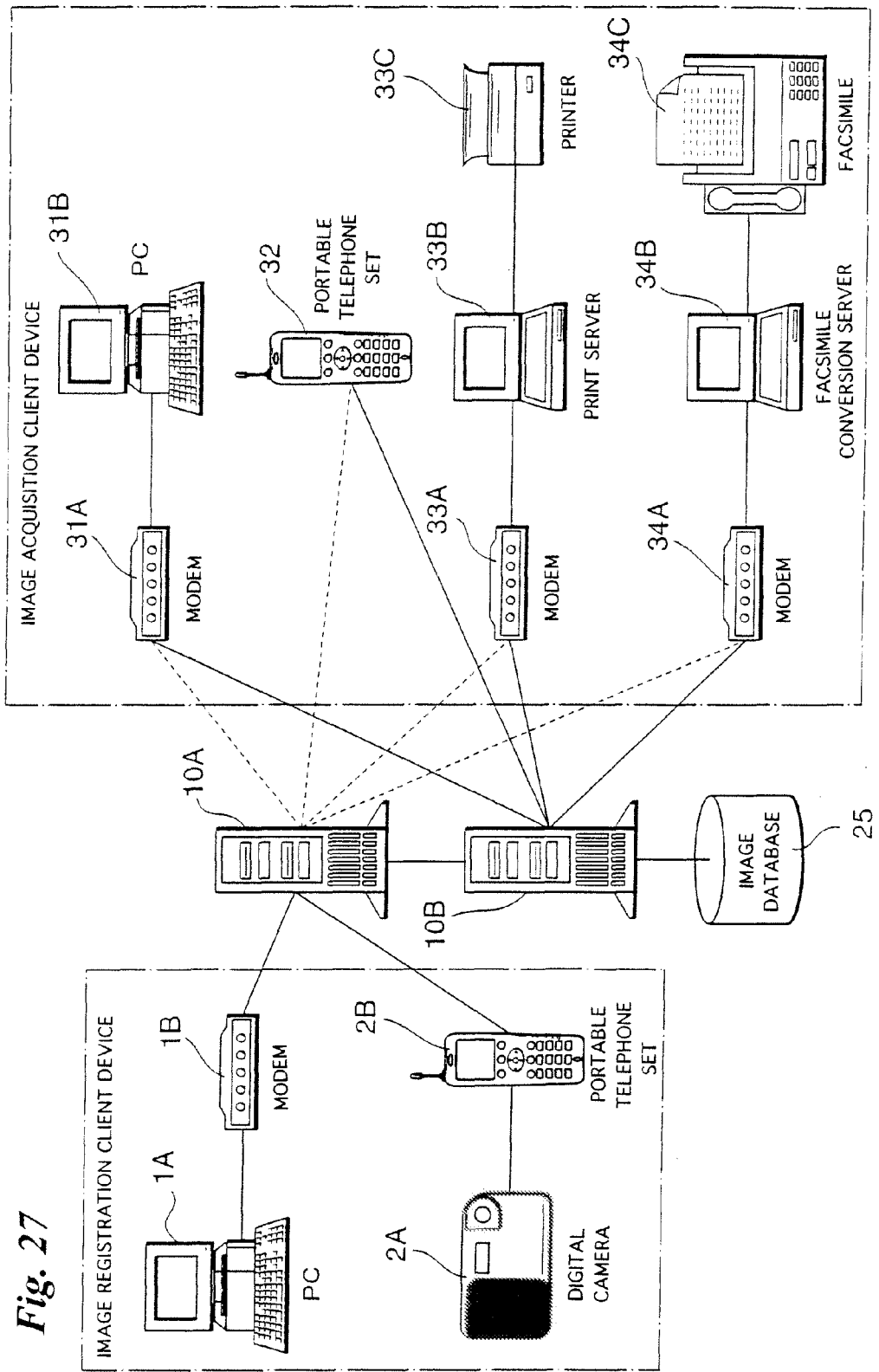
FIG. 27 illustrates the outline of an image registration system according to another embodiment.

FIG. 27 illustrates the outline of an image registration system according to another embodiment.

Although in the above-mentioned embodiment, one image registration/transmission server 10 is utilized, two image registration/transmission servers 10 are utilized in the image registration system shown in FIG. 27.

The first image registration/transmission server WA receives image data transmitted from an image registration client device, as described above. The received image data is transmitted to the second image registration/transmission server 10B from the first image registration/transmission server 10A, and is stored in an image database 25 by the second image registration/transmission server 10B.

When an image acquisition client device accesses the first image registration/transmission server 10A, the image database 25 is searched for image data suitable for display on the image acquisition client device, as described above. The image data is transmitted to the image acquisition client device from the second image registration/transmission server 10B. Further, data for displaying characters other than the image data is transmitted to the image acquisition client device from the first image registration/transmission server 10A.

Thus, the character data may be transmitted to the image acquisition client device from the first image registration/transmission server 10A, and the image data may be transmitted to the image acquisition client device from the second image registration/transmission server 10B.

Figure 28:
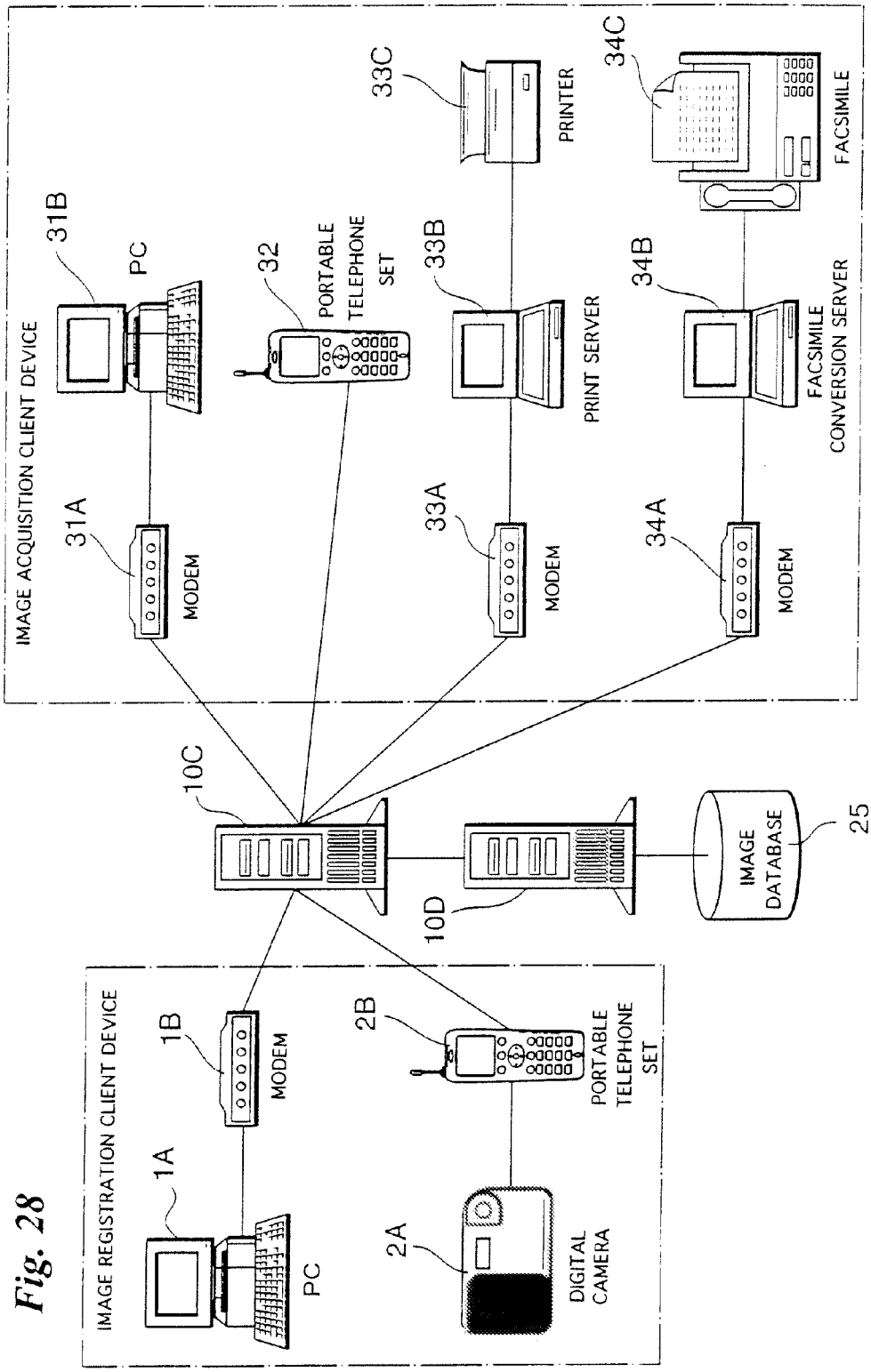
FIG. 28 illustrates the outline of an image registration system according to still another embodiment.

FIG. 28 illustrates the outline of an image registration system according to still another embodiment.

Also in the image registration system shown in FIG. 28, two image registration/transmission servers 10C and 10D are utilized.

Image data transmitted from an image registration client device is received by the first image registration/transmission server 10C. The received image data is transmitted to the second image registration/transmission server 10D by the first image registration/transmission server 10C. The image data transmitted from the image registration client device is stored in an image database 25 by the second image registration/transmission server 10D.

When the image acquisition client device accesses the first image registration/transmission server 10C, image data request data from the image acquisition client device, for example, a keyword is fed to the second image registration/transmission server 10D. In the second image registration/transmission server 10D, the image database 25 is searched. Image data retrieved from the image database 25 is fed to the first image registration/transmission server 10C from the second image registration/transmission server 10D. The image data is transmitted to the image acquisition client device by the first image registration/transmission server 10C.

Thus, the access of the image registration client device and the image acquisition client device may utilize the first image registration/transmission server 10C, and the retrieval of the image data in the image database 25 may utilize the second image registration/transmission server 10D.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image registration server which can communicate with client devices, comprising:
    an image data receiving device that receives image data transmitted from a type of the client devices;
    a request data receiving device that receives request data representing a request to transmit the image data transmitted from an other type of the client devices;
    a number-of-requests counting device that counts number-of-requests transmitted from the other type of the client devices for each type of the client devices;
    an image data generation device, if the number-of-requests reaches a predetermined number, that generates image data representing a same image as an image represented by the image data received by said image data receiving device and suitable for image output by the other type of the client devices which has requested more than or equal to the predetermined number; and an image data storage device that stores the image data generated by said image data generation device so as to be accessible.

2. An image transmission server which can communicate with client devices, comprising:

an image data generation device that generates image data representing a same image as an image represented by fed image data and suitable for image output by a client device;

an image data storage device that stores the image data generated by said image data generation device so as to be accessible from the client device;

a request data receiving device that receives request data representing a request to transmit the image data;

a number-of-requests counting device that counts number-of-requests transmitted from the client device for each type of the client devices;

an image data generation control device that makes the image data generation device generate suitable image data for a type of the client devices by which the number-of-requests counted by the counting device reaches a predetermined number;

an image data retrieval device responsive to the request data received by said request data receiving device that finds from the storage device the image data suitable for, image output by the type of the client device which has requested more than or equal to the predetermined number out of the image data stored in the storage device; and an image data transmission device that transmits to the client device the image data found by said image data retrieval device.

3. In an image registration server which can communicate with client devices, an image registering method, comprising:

receiving image data transmitted from a type of the client devices;

receiving request data representing a request to transmit the image data transmitted from an other type of the client devices;

counting number-of-requests transmitted from the other type of the client devices for each type of the client devices;

generating, if the number-of-requests reaches a predetermined number, image data representing a same image as an image represented by the received image data and suitable for image output by the other type of the client devices which has requested more than or equal to the predetermined number; and storing the generated image data so as to be accessible.

4. In an image transmission server which can communicate with client devices, an image transmitting method, comprising:

generating image data representing a same image as an image represented by fed image data and suitable for image output by a client device;

storing the generated image data so as to be accessible from the client device;

receiving request data representing a request to transmit;

counting number-of-requests transmitted from the client device for each type of the client devices;

controlling the generating to generate suitable image data for a type of the client devices by which the number-of-requests counted reaches a predetermined number;

finding the image data suitable for image output by the type of the client device which has requested more than or equal to the predetermined number out of the stored image data in response to the receiving request data; and transmitting to the client device the found image data.

5. The image registration server according to claim 1, wherein the client devices include a client code corresponding to the image data suitable for the client devices.

6. The image registration server according to claim 1, further comprising an image data transmitting device that transmits received image data by the image data receiving device to a second image registration server.

7. The image registration server according to claim 6, further comprising a second image data storage device that stores the image data transmitted by the image data transmitting device so as to be accessible.

8. The image registration server according to claim 1, further comprising a plurality of image registration servers.

* * * * *